US011592829B2

(12) United States Patent
Kobayashi et al.

(10) Patent No.: US 11,592,829 B2
(45) Date of Patent: Feb. 28, 2023

(54) CONTROL DEVICE AND CONTROL METHOD, PROGRAM, AND MOBILE OBJECT

(71) Applicant: Sony Corporation, Tokyo (JP)

(72) Inventors: Dai Kobayashi, Tokyo (JP); Ryo Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 337 days.

(21) Appl. No.: 16/767,593

(22) PCT Filed: Nov. 21, 2018

(86) PCT No.: PCT/JP2018/042921
§ 371 (c)(1),
(2) Date: May 28, 2020

(87) PCT Pub. No.: WO2019/111701
PCT Pub. Date: Jun. 13, 2019

(65) Prior Publication Data
US 2020/0387162 A1    Dec. 10, 2020

(30) Foreign Application Priority Data
Dec. 5, 2017   (JP) .............................. JP2017-233094

(51) Int. Cl.
*G05D 1/02* (2020.01)
*G06N 3/04* (2006.01)
*G06N 3/08* (2006.01)

(52) U.S. Cl.
CPC ........... *G05D 1/0221* (2013.01); *G05D 1/027* (2013.01); *G05D 1/0238* (2013.01);
(Continued)

(58) Field of Classification Search
CPC .... G05D 1/0221; G05D 1/0238; G05D 1/027; G05D 1/0272; G05D 1/0246;
(Continued)

(56) References Cited

U.S. PATENT DOCUMENTS 7,103,460 B1   9/2006 Breed
9,534,899 B2 * 1/2017 Gutmann ............... G05D 1/028
(Continued)

FOREIGN PATENT DOCUMENTS

CN    101509781 B  *  9/2011
EP    1 868 056 A2    12/2007
(Continued)

OTHER PUBLICATIONS

Jung et al.; Indoor Mobile Robot Localization and Mapping Based on Ambient Magnetic Fields and Aiding Radio Sources; IEEE Trans. on Instrumentation and Measurement; vol. 64, No. 7; Jul. 2015; pp. 1922-1934 (Year: 2015).*
(Continued)

*Primary Examiner* — Michael J Zanelli
(74) *Attorney, Agent, or Firm* — Xsensus LLP

(57) ABSTRACT

A control device and a control method can quickly estimate a self-location even when the self-location is unknown. In a case of storing information supplied in a time series detected by LIDAR or a wheel encoder and estimating a self-location by using the stored time-series information, when a position change happens unpredictably in advance such as a kidnap state is detected, the stored time-series information is reset, and then the self-location is estimated again. Example host platforms include a multi-legged robot, a flying object, and an in-vehicle system that autonomously moves in accordance with a mounted computing machine.

19 Claims, 22 Drawing Sheets

(52) U.S. Cl.
CPC .............. *G05D 1/0272* (2013.01); *G06N 3/04* (2013.01); *G06N 3/08* (2013.01)

(58) Field of Classification Search
CPC .......... G05D 1/0248; G05D 1/08; G06N 3/04; G06N 3/08; G01C 21/1652; G01C 21/1656
See application file for complete search history.

(56) References Cited

U.S. PATENT DOCUMENTS

| | | | | |
|---|---|---|---|---|
| 2005/0182518 A1* | 8/2005 | Karlsson | .............. | G05D 1/0246 700/253 |
| 2007/0290828 A1* | 12/2007 | Choi | .................... | G05D 1/0272 340/463 |

FOREIGN PATENT DOCUMENTS

| JP | 2010-79869 A | | 4/2010 | |
|---|---|---|---|---|
| JP | 2010-152787 A | | 7/2010 | |
| JP | 5629390 B2 | | 11/2014 | |
| JP | 2017134617 A | | 8/2017 | |
| KR | 20080085472 A | * | 9/2008 | ........... G05D 1/0246 |
| WO | WO-2004016400 A2 | * | 2/2004 | ........... G05D 1/0246 |
| WO | 2009/132317 A1 | | 10/2009 | |

OTHER PUBLICATIONS

Hanses et al.; Robust localisation for mobile robots in indoor environments; Proc. of the 2014 IEEE Emerging Technology and Factory Automation (ETFA), 2014; pp. 1-8 (Year: 2014).*

Tian et al.; Probabilistic double guarantee kidnapping detection in SLAM; Robotics Biomim; 2016 (Year: 2016).*

Lee et al.; Vision-Based Kidnap Recovery with SLAM for Home Cleaning Robots; J Intell Robot Syst 67, 7-24 (2012) (Year: 2012).*

Tae-Jae Lee et al. "A New Localization Method for Mobile Robot by Data Fusion Of Vision Sensor Data and Motion Sensor Data", Robotics and Biomimetics (ROBIO), 2012 IEEE International Conference On, IEEE, Dec. 11, 2012 (Dec. 11, 2012), pp. 723-728, XP032352864.

International Search Report and Written Opinion dated Jan. 29, 2019 for PCT/JP2018/042921 filed on Nov. 21, 2018, 6 pages including English Translation of the International Search Report.

* cited by examiner

CONTROL DEVICE AND CONTROL METHOD, PROGRAM, AND MOBILE OBJECT

CROSS-REFERENCE TO RELATED APPLICATIONS

The present application is based on PCT filing PCT/JP2018/042921, filed Nov. 21, 2018, which claims priority to JP 2017-233094, filed Dec. 5, 2017, the entire contents of each are incorporated herein by reference.

TECHNICAL FIELD

The present disclosure relates to a control device and a control method, a program, and a mobile object, and particularly relates to a control device and a control method for generating an action plan by a computing machine to enable autonomous movement even when a self-location is unknown, a program, and a mobile object.

BACKGROUND ART

In order to realize autonomous movement of a mobile object such as a robot, it is necessary to recognize and estimate a self-location, which is a starting point for planning an action. Therefore, there has been proposed a technology for recognizing a situation around the self by means such as a sensor, estimating a self-location, and planning an autonomous movement.

For example, in a case of sequentially estimating a self-location by using information on a self-location continuously detected in the past, in a case where a self-location has been moved by some external force to a self-location completely different from a previous tendency of the self-location, continuity with the past self-location information is lost, which causes a state of being unable to recognize the self-location.

Therefore, there has been proposed a technology for correcting a multiplex state information to calculate final location information of a mobile device and reflecting a moving distance during a kidnap, when an abnormal movement state such as a slip or a kidnap (a state where the self-location cannot be recognized) occurs, which is a state where the self-location cannot be recognized (see Patent Document 1).

Furthermore, there has been proposed a technology for monitoring a fluctuation due to a difference between a control input amount related to traveling and an actual movement amount, and stopping traveling when the fluctuation deviates from a controllable range due to a disturbance and the self-location cannot be recognized (see Patent Document 2).

CITATION LIST

Patent Document

Patent Document 1: Japanese Patent No. 4718518
Patent Document 2: Japanese Patent Application Laid-Open No. 2013-45298

SUMMARY OF THE INVENTION

Problems to be Solved by the Invention

Patent Document 1 specifies that correction after the kidnap reflects a movement distance during the kidnap, and the self-location is not to be determined again. Therefore, there is a possibility that the self-location cannot be detected accurately.

Furthermore, Patent Document 2 is limited to monitoring a fluctuation due to a difference between a control input amount and an actual movement amount, and there is a possibility that the self-location cannot be estimated again by using a plurality of sensors.

The present disclosure has been made in view of such a situation, and it is particularly intended to enable estimation of the self-location again from a state where the self-location is unknown.

Solutions to Problems

A control device according to an aspect of the present disclosure is a control device including: a self-position detection unit configured to detect a self-position on the basis of sensor information; a position change detection unit configured to detect a position change unpredictable in advance, on the basis of a detection result by the self-position detection unit; and a self-location estimation unit configured to estimate a self-location with a first estimation model on the basis of sensor information, and estimate a self-location with a second estimation model different from the first estimation model in a case where the position change unpredictable in advance is detected by the position change detection unit.

The self-location estimation unit may include: a time-series information accumulation unit that accumulates the sensor information as time-series information; and a time-series information self-location estimation unit configured to use time-series information accumulated in the time-series information accumulation unit to estimate the self-location, and output an estimation result as a time-series information self-location. In the time-series information accumulation unit, the time-series information of a past time that has been accumulated may be reset in a case where the position change unpredictable in advance is detected. The time-series information self-location estimation unit may be configured to: use time-series information accumulated in the time-series information accumulation unit to estimate the self-location, as the first estimation model; and use time-series information accumulated in the time-series information accumulation unit after time-series information of a past time that has been accumulated in the time-series information accumulation unit is reset, to estimate the self-location, as the second estimation model.

The past time-series information accumulated in the time-series information accumulation unit can be deleted by the reset, in an order from time-series information accumulated longer than a predetermined time.

The time-series information self-location estimation unit may be configured to: reduce a weight of the self-location estimated with the time-series information as the time-series information has been accumulated for a longer time in the time-series information accumulation unit after the reset is performed on past time-series information accumulated in the time-series information accumulation unit, to estimate the time-series information self-location.

The self-location estimation unit may include a time-series information self-location estimation unit configured to estimate a time-series information self-location by using a Kalman filter that repeats a step of updating an observation value of a prior probability density distribution with time-series information that is latest. The time-series information self-location estimation unit may be configured to: estimate the time-series information self-location by using a Kalman filter that repeats a step of updating an observation value of a prior probability density distribution with time-series information that is latest, as the first estimation model, and estimate the time-series information self-location by using the Kalman filter after maximizing a weight of the time-series information that is latest, as the second estimation model, in a case where the position change unpredictable in advance is detected.

The self-location estimation unit may include: a time-series information accumulation unit that accumulates as time-series information sensed with the sensor information; a time-series information self-location estimation unit configured to use time-series information accumulated in the time-series information accumulation unit to estimate the self-location, and output an estimation result as a time-series information self-location; and a current information self-location estimation unit configured to estimate the self-location on the basis of current information that is current information sensed with the sensor information, and output as a current information self-location. The self-location estimation unit may be configured to adopt the time-series information self-location as a self-location estimation result in a case where the position change unpredictable in advance is not detected, and adopt the current information self-location as a self-location estimation result in a case where the position change unpredictable in advance is detected.

The self-location estimation unit may be configured to: cause transition of an operation mode to at least a first mode, a second mode, and a third mode in accordance with a detection result of the position change detection unit; set the operation mode to the first mode at a start of an operation and estimate the self-location with the first estimation model; cause, in the first mode, transition of the operation mode to the second mode and notify that the position change unpredictable in advance has been detected in a case where the position change unpredictable in advance is detected by the position change detection unit; cause, in the second mode, transition of the operation mode to the third mode after a predetermined time has elapsed, and estimate the self-location with the second estimation model; and cause, in the third mode, transition of the operation mode to the first mode after a predetermined time has elapsed.

The self-location estimation unit may include: a time-series information accumulation unit that accumulates the sensor information as time-series information; a time-series information self-location estimation unit configured to use time-series information accumulated in the time-series information accumulation unit to estimate the self-location, and output an estimation result as a time-series information self-location; and a current information self-location estimation unit configured to estimate the self-location on the basis of current information that is current information sensed with the sensor information, and output as a current information self-location. The self-location estimation unit may be configured to: adopt, in the first mode, as a self-location estimation result, the time-series information self-location estimated by the time-series information self-location estimation unit with use of time-series information accumulated in the time-series information accumulation unit, as the first estimation model; and adopt, in the third mode, as a self-location estimation result, the current information self-location estimated by the current information self-location estimation unit with use of the current information, as the second estimation model.

The position change unpredictable in advance may be a change to a state where a change in the self-location and a position loses continuity. The first mode may be a normal mode, the second mode may be an uncertain self-location mode, and the third mode may be a current information self-location estimation mode.

The self-location estimation unit may be configured to cause transition of the operation mode to the uncertain self-location mode, which is the second mode, when the position change unpredictable in advance is detected, in a case where the operation mode is the current information self-location estimation mode, which is the third mode.

The state where a change in the self-location and a position loses continuity may include a kidnap state, a slip state of a sole contact surface and a wheel, getting on and off of a non-fixed object, and a sensor abnormal state.

The position change unpredictable in advance may be a change to an accident occurrence state. The first mode may be the normal mode, the second mode may be a right-after-accident mode, and the third mode may be a control recovery mode.

The accident occurrence state may include a collision with a person, an object, and another machine or vehicle, a puncture, a missing part, and a falling state of a part and a cargo.

The time-series information may be three-dimensional point cloud information detected by LIDAR, and may be location information, a position, a velocity, an acceleration, and an angular velocity detected by a wheel encoder. The time-series information self-location estimation unit is configured to estimate the self-location by using a Kalman filter or a particle filter on the basis of the time-series information, and output an estimation result as a time-series information self-location. The current information may be a parallax image captured by a stereo camera. The current information self-location estimation unit is configured to generate a depth image from the parallax image, extract an image feature amount from the depth image, estimate a self-location on the basis of the image feature amount, and output an estimation result as a current information self-location.

The sensor information used when the self-position detection unit detects the self-position may include a vertical acceleration. The self-position detection unit may include: a frequency component extraction unit configured to extract a frequency component of a change in the vertical acceleration; a feature amount extraction unit configured to extract a feature amount from a frequency component extracted by the frequency component extraction unit; and a position detection unit configured to detect the self-position on the basis of the feature amount.

It is possible to further include a database in which the position and a feature amount of the frequency component are registered in association with each other by learning, on the basis of sensor information for a known position. The position detection unit may be configured to detect the position by searching for a corresponding position from the database on the basis of the feature amount.

In the database, it is possible to register the position and the feature amount of the frequency component in association with each other by learning using a neural network, on the basis of sensor information for the known position.

A control method according to an aspect of the present disclosure is a control method including: a self-position detection process of detecting a self-position on the basis of sensor information; a position change detection process of detecting a position change unpredictable in advance on the basis of a detection result by the self-position detection process; and a self-location estimation process of estimating a self-location with a first estimation model on the basis of sensor information, and estimating a self-location with a second estimation model different from the first estimation model in a case where the position change unpredictable in advance is detected by the position change detection process.

A program according to an aspect of the present disclosure is a program for causing a computer to function as: a self-position detection unit configured to detect a self-position on the basis of sensor information; a position change detection unit configured to detect a position change unpredictable in advance, on the basis of a detection result by the self-position detection unit; and a self-location estimation unit configured to estimate a self-location with a first estimation model on the basis of sensor information, and estimate a self-location with a second estimation model different from the first estimation model in a case where the position change unpredictable in advance is detected by the position change detection unit.

A mobile object according to an aspect of the present disclosure is a mobile object including: a self-position detection unit configured to detect a self-position on the basis of sensor information; a position change detection unit configured to detect a position change unpredictable in advance, on the basis of a detection result by the self-position detection unit; a self-location estimation unit configured to estimate a self-location with a first estimation model on the basis of sensor information, and estimate a self-location with a second estimation model different from the first estimation model in a case where the position change unpredictable in advance is detected by the position change detection unit; an action plan generation unit configured to generate an action plan on the basis of a peripheral situation of a self-location estimated by the self-location estimation unit; and a control unit configured to control an operation of the mobile object on the basis of an action plan determined by the action plan generation unit.

In an aspect of the present disclosure, a self-position is detected on the basis of sensor information, a position change unpredictable in advance is detected on the basis of a detection result, a self-location is estimated with the first estimation model on the basis of sensor information, and the self-location is estimated with the second estimation model different from the first estimation model in a case where the position change unpredictable in advance is detected.

Effects of the Invention

According to an aspect of the present disclosure, in particular, a self-location can be estimated again even in a state where the self-location is unknown.

MODE FOR CARRYING OUT THE INVENTION

Figure 1:
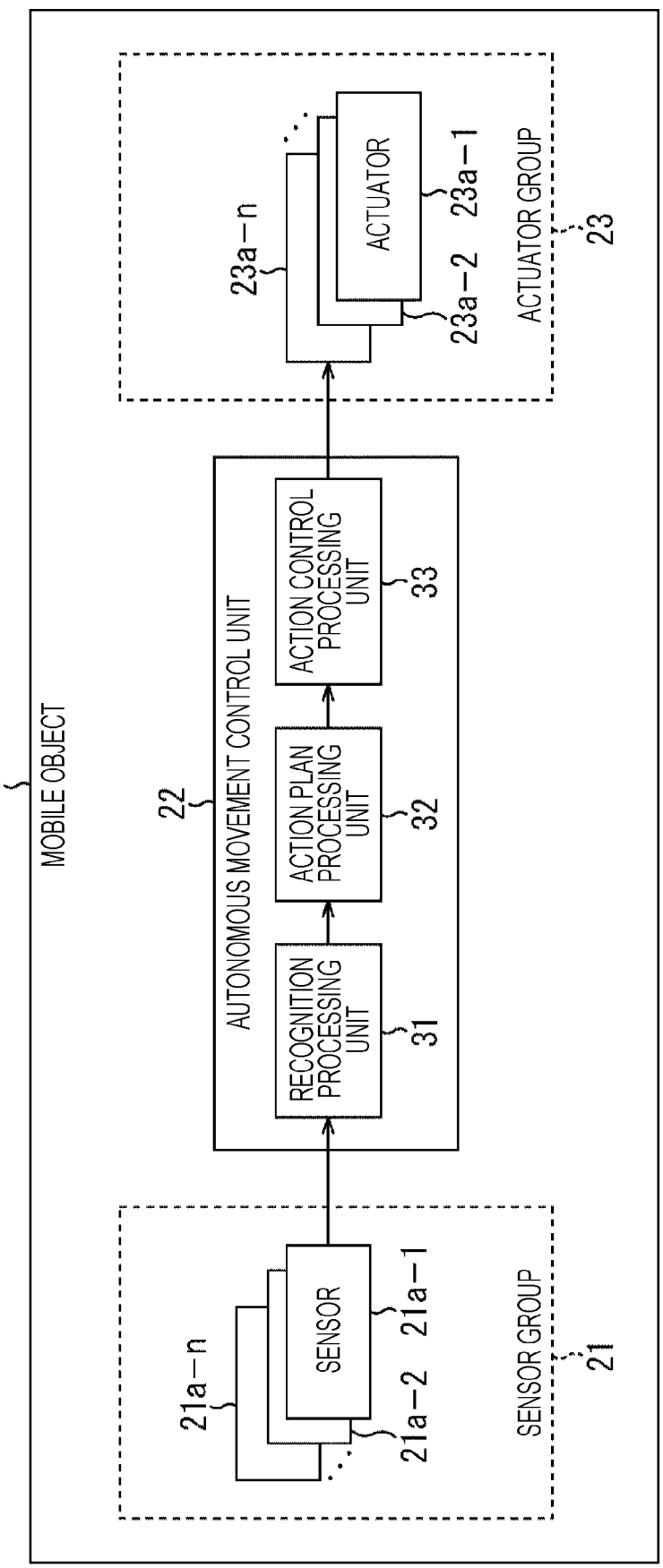
FIG. 1 is a diagram illustrating a configuration example of a mobile object for explaining an outline of the present disclosure.

Hereinafter, a preferred embodiment of the present disclosure will be described in detail with reference to the accompanying drawings. Note that, in this specification and the drawings, components having substantially the same functional configuration are denoted by the same reference numerals, and redundant explanations are omitted.

Hereinafter, embodiments for implementing the present technology will be described. The description will be given in the following order.

1. Outline of present disclosure
2. Preferred embodiment
3. First modified example
4. Second modified example
5. Third modified example
6. Example of execution by software 1. Outline of Present Disclosure A mobile object of the present disclosure is a mobile object that newly estimates a self-location again even after the self-location is lost due to an external force, when repeating new self-location estimation by using past self-location estimation results that have been continuously estimated.

FIG. 1 illustrates a configuration example that is an outline of a mobile object 11 according to the present disclosure.

The mobile object 11 is, for example, a robot or the like, and includes a sensor group 21, an autonomous movement control unit 22, and an actuator group 23.

The sensor group 21 includes sensors 21a-1 to 21a-n that detect various kinds of information necessary for recognizing a situation inside the mobile object 11 and in surroundings of the mobile object 11, and outputs a detection result to the autonomous movement control unit 22. Furthermore, in a case where it is not necessary to particularly distinguish, the sensors 21a-1 to 21a-n are simply referred to as a sensor 21a, and other configurations are also similarly referred to.

More specifically, the sensors 21a-1 to 21a-n include, for example, a camera that captures an image of surroundings of the mobile object 11, an acceleration sensor that detects a movement of the mobile object 11, LIDAR or a time of flight (ToF) sensor that measures a distance to an object existing around the mobile object 11, a geomagnetic sensor, a gyro sensor, or an acceleration sensor that detects a direction, an air pressure sensor that detects a change in a surrounding air pressure, a contact sensor that detects the presence or absence of contact and the like, a temperature sensor that detects a temperature, a humidity sensor that detects a humidity, a position sensitive detection unit (PSD) distance measurement sensor, a global navigation satellite system (GNSS) that detects a location on the earth, and the like.

The autonomous movement control unit 22 recognizes a situation of surroundings from various detection results of the sensor group 21, generates an action plan on the basis of a recognition result, and operates various actuators 23a-1 to 23a-n of the actuator group 23 configured to drive the robot in accordance with the action plan. Furthermore, in a case where it is not necessary to particularly distinguish, the actuators 23a-1 to 23a-n are simply referred to as an actuator 23a, and the other configurations are also similarly referred to.

More specifically, the autonomous movement control unit 22 includes a recognition processing unit 31, an action plan processing unit 32, and an action control processing unit 33.

On the basis of a detection result supplied from the sensor group 21, the recognition processing unit 31 executes recognition processing to recognize, for example; a type, a position, and an attribute of an image, a person, an object, and an expression; a location of itself and an obstacle; and the like, and outputs as a recognition result to the action plan processing unit 32. Furthermore, the recognition processing unit 31 estimates a self-location on the basis of a detection result supplied from the sensor group 21. At this time, the recognition processing unit 31 estimates the self-location by using a predetermined model. Moreover, on the basis of a detection result supplied by the sensor group 21, the recognition processing unit 31 estimates the self-location by using a model different from the predetermined model, when having a state where the self-location cannot be estimated by using the predetermined model due to an influence of an external force.

On the basis of the recognition result, the action plan processing unit 32 generates an action plan, which is an entire action of the mobile object 11 such as a movement trajectory, a state change, and a velocity or an acceleration of equipment related to the movement of the mobile object 11, and supplies to the action control processing unit 33.

On the basis of the action plan supplied from the action plan processing unit 32, the action control processing unit 33 generates a control signal for controlling a specific movement of each of the actuators 23a-1 to 23a-n of the actuator group 23, and operates the actuator group 23.

The actuator group 23 operates the actuators 23a-1 to 23a-n that specifically operate the mobile object 11 on the basis of the control signal supplied from the action control processing unit 33. More specifically, the actuators 23a-1 to 23a-n operate operations of a motor, a servo motor, a brake, and the like that realize a specific movement of the mobile object 11, on the basis of the control signal.

Furthermore, the actuators 23a-1 to 23a-n include a configuration that realizes an expansion and contraction motion, a bending and stretching motion, a turning motion, and the like, and may also further include a configuration such as a display unit including a light emitting diode (LED), a liquid crystal display (LCD), or the like that displays information, and a speaker that outputs sound. Therefore, by controlling the actuator group 23 on the basis of the control signal, operations of various devices that drive the mobile object 11 are realized, information is displayed, and sound is outputted.

In other words, by controlling the actuators 23a-1 to 23a-n of the actuator group 23, an operation related to a movement of the mobile object 11 is controlled, and presentation of various types of information such as information display and audio output is also controlled.

<Outline of Self-Location Estimation of Present Disclosure>

The recognition processing unit 31 estimates a self-location on the basis of a detection result supplied from the sensor group 21. At this time, the recognition processing unit 31 uses a past self-location estimation result as a predetermined model, to estimate a current self-location. Then, when detecting a state where the past self-location estimation result cannot be used, such as when a large behavior different from ones before is detected due to an external force, on the basis of a detection result supplied from the sensor group 21, the recognition processing unit 31 estimates the self-location by using a model different from the predetermined model, for example, on the basis of current information on a peripheral itself.

Figure 2:
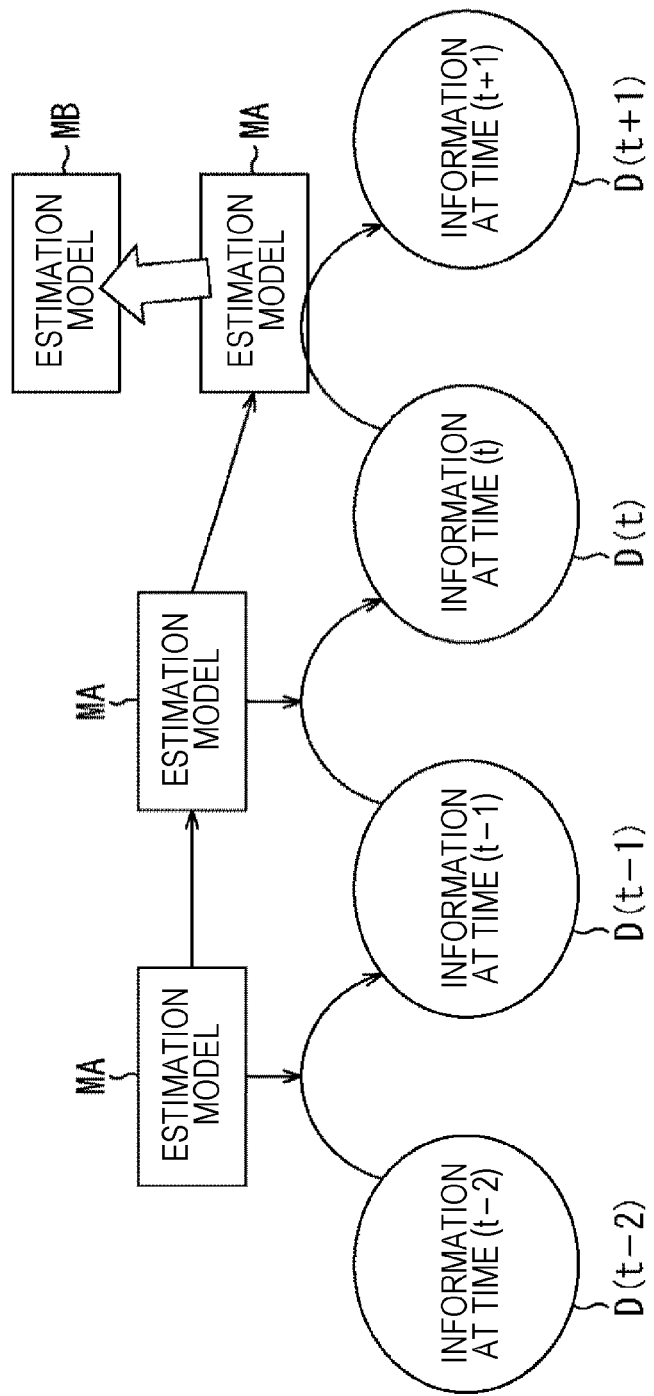
FIG. 2 is a diagram for explaining an outline of the present disclosure.

More specifically, for example, as illustrated in FIG. 2, at a time (t−1), the recognition processing unit 31 uses a detection result supplied by the sensor group 21 at the time (t−1) and a self-location D(t−2), which is information at a past time (t−2), to estimate a current self-location D(t−1) with an estimation model MA.

Similarly, at a time t, the recognition processing unit 31 uses a detection result supplied by the sensor group 21 at the time t and the self-location D(t−1), which is information at a past time (t−1) (further, the self-location D(t−2), which is information at the past time (t−2), as necessary), to estimate a current self-location D(t) with the estimation model MA.

Next, at a time (t+1), in a case where the self-location changes greatly due to an external force and loses a continuous example with the past self-location estimation result to cause a state where the past self-location estimation result cannot be used, the recognition processing unit 31 switches the estimation model to an estimation model MB different from the estimation model MA, to estimate a self-location D(t+1), for example, by using only a detection result supplied by the sensor group 21 at the current time (t+1).

In other words, for example, in a case where the self-location can be continuously estimated, the recognition processing unit 31 estimates the self-location with the estimation model MA by using a current detection result and a past self-location estimation result. Whereas, when the self-location greatly changes due to some external force and the past self-location estimation result cannot be used, the recognition processing unit 31 estimates the self-location by using the estimation model MB that is different from the estimation model MA and can estimate the self-location from only the current detection result of the sensor group 21. However, in general, the estimation model MA is usually used since the estimation model MB has self-location detection accuracy lower than that of the estimation model MA.

As described above, the estimation of the self-location can be continued by switching the estimation model even when having a state where the self-location is lost, in accordance with a detection result of the sensor group 21.

As a result, even in a state where the self-location is unknown, it is possible to continue estimating the self-location again, and it is possible to continuously realize autonomous action.

2. Preferred Embodiment

Configuration Example of Mobile Object Control System that Controls Mobile Object of Present Disclosure A mobile object control system that controls the mobile object 11 for realization of the above-described functions will be described.

Figure 3:
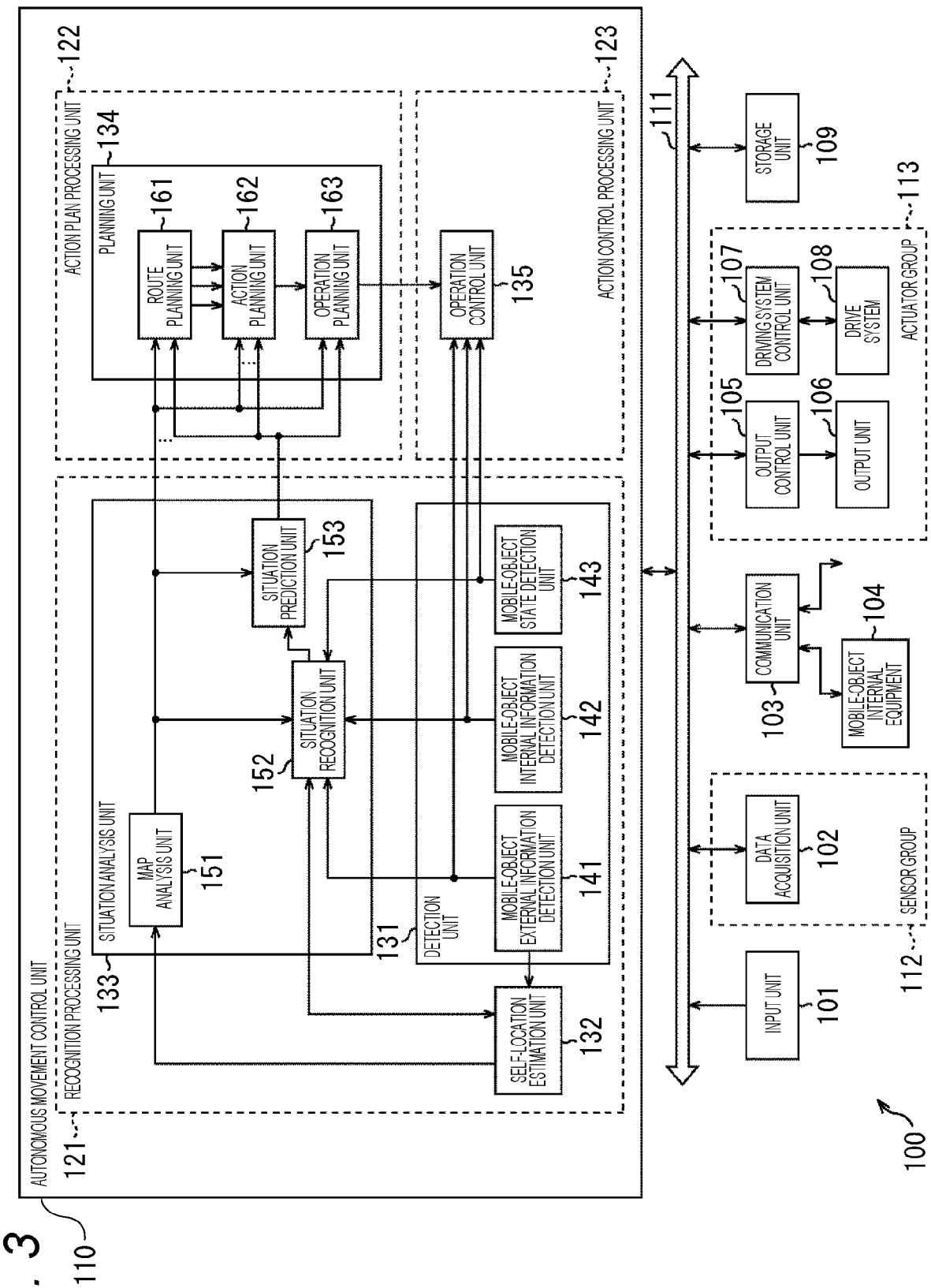
FIG. 3 is a block diagram for explaining a configuration example of a mobile object control system that controls the mobile object according to the present disclosure.

FIG. 3 is a block diagram illustrating a configuration example of a schematic function of a mobile object control system 100 that controls the mobile object 11 according to the present disclosure. Note that the mobile object control system 100 in FIG. 3 is an example of a mobile object control system that controls the mobile object 11 including a robot to which the present technology can be applied. However, the mobile object control system 100 can also be applied as a system that controls other mobile objects such as, for example, an aircraft, a ship, and a multi-rotor copter (drone). Furthermore, the robot may be a wheel-type robot, an automatic driving vehicle that can be boarded, or a multi-legged walking robot.

The mobile object control system 100 includes an input unit 101, a data acquisition unit 102, a communication unit 103, mobile-object internal equipment 104, an output control unit 105, an output unit 106, a driving system control unit 107, a drive system 108, a storage unit 109, and an autonomous movement control unit 110. The input unit 101, the data acquisition unit 102, the communication unit 103, the output control unit 105, the driving system control unit 107, the storage unit 109, and the autonomous movement control unit 110 are mutually connected via a communication network 111. The communication network 111 includes, for example: a communication network and bus conforming to any standard such as a local area network (LAN) such as a controller area network (CAN), local interconnect network (LIN), or IEEE802.3, or FlexRay (registered trademark); an original communication system that is not standardized; or the like. Note that there may be a case where each unit of the mobile object control system 100 is directly connected without via the communication network 111.

Note that, hereinafter, in a case where each unit of the mobile object control system 100 communicates via the communication network 111, the description of the communication network 111 is to be omitted. For example, in a case where the input unit 101 and the autonomous movement control unit 110 communicate via the communication network 111, it is simply described that the input unit 101 and the autonomous movement control unit 110 communicate.

The input unit 101 includes a device used by a passenger for inputting various data, instructions, and the like. For example, the input unit 101 includes: operation devices such as a touch panel, a button, a microphone, a switch, and a lever; an operation device that can be inputted by a method other than manual operation, such as with voice, a gesture or the like; and the like. Furthermore, for example, the input unit 101 may be a remote control device using infrared ray or other radio waves, or external connection equipment such as mobile equipment or wearable equipment corresponding to an operation of the mobile object control system 100. The input unit 101 generates an input signal on the basis of data, instructions, and the like inputted by the passenger, and supplies to each unit of the mobile object control system 100.

The data acquisition unit 102 includes various sensors and the like that acquire data to be used for processing of the mobile object control system 100, and supplies the acquired data to each unit of the mobile object control system 100.

For example, the data acquisition unit 102 constitutes a sensor group 112 by including various sensors for detection of a state and the like of the mobile object, and corresponds to the sensor groups 21 including the sensors 21a-1 to 21a-n in FIG. 1. Specifically, for example, the data acquisition unit 102 includes a gyro sensor, an acceleration sensor, an inertial measurement unit (IMU), and a sensor and the like for detection of: an operation amount of an acceleration input of an accelerator and the like; an operation amount of a deceleration input; an operation amount of a direction instruction input; the number of rotations, input/output energy, and a fuel amount of driving devices such as an engine and a motor; a torque amount of an engine, a motor, and the like; or a rotational speed, torque, or the like of a wheel or a joint.

Furthermore, for example, the data acquisition unit 102 includes various sensors for detection of information external to the mobile object. Specifically, for example, the data acquisition unit 102 includes an imaging device such as a time of flight (ToF) camera, a stereo camera, a monocular camera, an infrared camera, a polarization camera, and other camera. Furthermore, for example, the data acquisition unit 102 includes an environment sensor for detection of weather, meteorological phenomena, or the like, and a surrounding information detection sensor for detection of an object around the mobile object. The environment sensor includes, for example, a raindrop sensor, a fog sensor, a sunshine sensor, a snow sensor, and the like. The surrounding information detection sensor includes, for example, a laser ranging sensor, an ultrasonic sensor, a radar, light detection and ranging or laser imaging detection and ranging (LiDAR), a sonar, and the like.

Moreover, for example, the data acquisition unit 102 includes various sensors for detection of a current location of the mobile object. Specifically, for example, the data acquisition unit 102 includes a global navigation satellite system (GNSS) receiver or the like that receives a GNSS signal from a GNSS satellite.

The communication unit 103 communicates with the mobile-object internal equipment 104, and various types of equipment, a server, a base station, and the like external to the mobile object, to transmit data supplied from each unit of the mobile object control system 100 and supply the received data to each unit of the mobile object control system 100. Note that a communication protocol supported by the communication unit 103 is not particularly limited, and the communication unit 103 can also support a plurality of types of communication protocols.

For example, the communication unit 103 performs wireless communication with the mobile-object internal equipment 104 through wireless LAN, Bluetooth (registered trademark), near field communication (NFC), a wireless USB (WUSB), or the like. Furthermore, for example, the communication unit 103 performs wired communication with the mobile-object internal equipment 104 through a universal serial bus (USB), a high-definition multimedia interface (HDMI) (registered trademark), a mobile high-definition link (MHL), or the like, via a connection terminal (not illustrated) (and a cable if necessary).

Moreover, for example, via a base station or an access point, the communication unit 103 communicates with equipment (for example, an application server or a control server) existing on an external network (for example, the Internet, a cloud network, or a network unique to a business operator). Furthermore, for example, the communication unit 103 uses a peer to peer (P2P) technology to communicate with a terminal (for example, a terminal of a pedestrian or a store, or a machine type communication (MTC) terminal) existing near the mobile object. Moreover, for example, in a case where the mobile object 11 is a car, the communication unit 103 performs V2X communication such as vehicle-to-vehicle communication, vehicle-to-infrastructure communication, communication between a mobile object and a house (vehicle-to-home), and vehicle-to-pedestrian communication. Furthermore, for example, the communication unit 103 includes a beacon reception unit, and receives radio waves or electromagnetic waves transmitted from a wireless station or the like installed on a road, and acquires information such as a current location, traffic congestion, traffic regulation, a required time, and the like.

The mobile-object internal equipment 104 includes, for example, mobile equipment or wearable equipment owned by a passenger, information equipment carried in or attached to the mobile object, a navigation device that searches for a route to any given destination, and the like.

The output control unit 105 controls output of various types of information to the passenger of the mobile object or the outside of the mobile object. For example, the output control unit 105 controls output of visual information and auditory information from the output unit 106 by generating an output signal including at least one of visual information (for example, image data) or auditory information (for example, sound data), and supplying to the output unit 106. Specifically, for example, the output control unit 105 combines image data captured by different imaging devices of the data acquisition unit 102 to generate an overhead view image, a panoramic image, or the like, and supplies an output signal including the generated image to the output unit 106. Furthermore, for example, the output control unit 105 generates sound data including warning sound, warning message, or the like for dangers such as collision, contact, entry into danger zone, and the like, and supplies an output signal including the generated sound data to the output unit 106.

The output unit 106 includes a device capable of outputting visual information or auditory information to the passenger of the mobile object or to the outside of the mobile object. For example, the output unit 106 includes a display device, an instrument panel, audio speakers, headphones, a wearable device such as a glasses-type display worn by the passenger, a projector, a lamp, and the like. The display device provided to the output unit 106 may be, for example, a device that displays visual information in a driver's field of view, such as a device or the like having a head-up display, a transmissive display, or an augmented reality (AR) display function, in addition to a device having a normal display. Note that the output control unit 105 and the output unit 106 are not indispensable configurations for autonomous movement processing, and may be omitted as necessary.

The driving system control unit 107 controls the drive system 108 by generating various control signals and supplying to the drive system 108. Furthermore, the driving system control unit 107 supplies a control signal to each unit other than the drive system 108 as necessary, and gives a notification or the like of a control state of the drive system 108.

The drive system 108 includes various devices related to a driving system of the mobile object. For example, the drive system 108 includes a servo motor that is provided for each joint of four legs and can specify an angle and torque, a motion controller that disassembles and replaces a motion of a movement of the robot itself into a movement of four legs, and a feedback control device using a sensor in each motor and a sensor on a sole surface.

In another example, the drive system 108 includes a motor having four to six propellers upward of a body, and a motion controller that disassembles and replaces a motion of a movement of the robot itself into a rotation amount of each motor.

Moreover, in another example, the drive system 108 includes: a driving force generation device for generation of a driving force such as an internal combustion engine or a driving motor, a driving force transmission mechanism for transmission of a driving force to wheels, a steering mechanism to adjust a steering angle, a braking device to generate a braking force, an antilock brake system (ABS), an electronic stability control (ESC), an electric power steering device, and the like. Note that the output control unit 105, the output unit 106, the driving system control unit 107, and the drive system 108 constitute an actuator group 113, and correspond to the actuator group 23 including the actuators 23*a*-1 to 23*a-n* in FIG. 1.

The storage unit 109 includes, for example, a magnetic storage device such as a read only memory (ROM), a random access memory (RAM), and a hard disc drive (HDD), a semiconductor storage device, an optical storage device, a magneto-optical storage device, and the like. The storage unit 109 stores various programs, data, and the like used by each unit of the mobile object control system 100. For example, the storage unit 109 stores map data such as a three-dimensional high-accuracy map such as a dynamic map, a global map that is less accurate than the high-accuracy map and covers a wide area, and a local map that includes information of surroundings of the mobile object.

The autonomous movement control unit 110 performs control related to autonomous movement such as automatic driving or driving assistance. Specifically, for example, the autonomous movement control unit 110 performs cooperative control for the purpose of avoidance of collisions or mitigation of impacts of the mobile object, follow-up based on of a distance between mobile objects, speed maintenance movement of the mobile object, or realizing a function of collision warning of the mobile object. Furthermore, for example, the autonomous movement control unit 110 performs cooperative control for the purpose of autonomous movement or the like of autonomously moving without depending on an operation of an operator or a user. The autonomous movement control unit 110 includes a detection unit 131, a self-location estimation unit 132, a situation analysis unit 133, a planning unit 134, and an operation control unit 135. Among these, the detection unit 131, the self-location estimation unit 132, and the situation analysis unit 133 constitute a recognition processing unit 121, and correspond to the recognition processing unit 31 in FIG. 1. Furthermore, the planning unit 134 constitutes an action plan processing unit 122, and corresponds to the action plan processing unit 32 in FIG. 1. Moreover, the operation control unit 135 constitutes an action control processing unit 123, and corresponds to the action control processing unit 33 in FIG. 1.

The detection unit 131 detects various kinds of information necessary for controlling an autonomous movement. The detection unit 131 includes a mobile-object external information detection unit 141, a mobile-object internal information detection unit 142, and a mobile-object state detection unit 143.

The mobile-object external information detection unit 141 performs detection processing on information external to the mobile object, on the basis of data or a signal from each unit of the mobile object control system 100. For example, the mobile-object external information detection unit 141 performs detection processing, recognition processing, and tracking processing on an object around the mobile object, and detection processing on a distance to the object. The objects to be detected include, for example, mobile objects, people, obstacles, structures, roads, traffic lights, traffic signs, road markings, and the like. Furthermore, for example, the mobile-object external information detection unit 141 performs detection processing on a surrounding environment of the mobile object. The surrounding environment to be detected includes, for example, weather, a temperature, a humidity, a brightness, road surface conditions, and the like. The mobile-object external information detection unit 141 supplies data indicating a result of the detection processing to the self-location estimation unit 132, a map analysis unit 151 and a situation recognition unit 152 of the situation analysis unit 133, the operation control unit 135, and the like.

The mobile-object internal information detection unit 142 performs detection processing on information internal to the mobile object, on the basis of data or a signal from each unit of the mobile object control system 100. For example, the mobile-object internal information detection unit 142 performs diver authentication processing and recognition processing, driver's state detection processing, passenger detection processing, detection processing on an environment inside the mobile object, and the like. The driver's state to be detected includes, for example, a physical condition, an awakening degree, a concentration degree, a fatigue degree, a line-of-sight direction, and the like. The environment inside the mobile object to be detected includes, for example, a temperature, a humidity, a brightness, odor, and the like. The mobile-object internal information detection unit 142 supplies data indicating a result of the detection processing to the situation recognition unit 152 of the situation analysis unit 133, the operation control unit 135, and the like.

The mobile-object state detection unit 143 performs detection processing on a state of the mobile object, on the basis of data or a signal from each unit of the mobile object control system 100. The state of the mobile object to be detected includes, for example, a velocity, an acceleration, a steering angle, the presence/absence and contents of an abnormality, a state of driving operation, a position and inclination of a power seat, a state of a door lock, a state of other equipment mounted on the mobile object, and the like. The mobile-object state detection unit 143 supplies data indicating a result of the detection processing to the situation recognition unit 152 of the situation analysis unit 133, the operation control unit 135, and the like.

The self-location estimation unit 132 performs estimation processing on, for example, a location and a position of the mobile object, on the basis of data or a signal from each unit of the mobile object control system 100, such as the mobile-object external information detection unit 141, and the situation recognition unit 152 of the situation analysis unit 133. Furthermore, the self-location estimation unit 132 generates a local map (hereinafter, referred to as a self-location estimation map) to be used for self-location estimation, as necessary. The self-location estimation map is, for example, a highly accurate map using a technology such as simultaneous localization and mapping (SLAM). The self-location estimation unit 132 supplies data indicating a result of the estimation processing to the map analysis unit 151 and the situation recognition unit 152 of the situation analysis unit 133, and the like. Furthermore, the self-location estimation unit 132 causes the storage unit 109 to store the self-location estimation map.

Moreover, the self-location estimation unit 132 accumulates time-series information supplied in a time series in the database on the basis of a detection result supplied from the sensor group 112, estimates a self-location on the basis of the accumulated time-series information, and outputs as a time-series information self-location. Furthermore, the self-location estimation unit 132 estimates a self-location on the basis of the current detection result supplied from the sensor group 112, and outputs as a current information self-location. Then, the self-location estimation unit 132 outputs as the self-location estimation result by integrating or switching the time-series information self-location and the current information self-location. Moreover, the self-location estimation unit 132 detects a position of the mobile object 11 on the basis of the detection result supplied from the sensor group 112, and estimates the self-location from only the current information self-location when a position change is detected and the self-location greatly changes, and it is considered that the estimation accuracy of the time-series information self-location is to decrease. Furthermore, for example, in a case where the mobile object 11 is mounted on another mobile object and moves, the self-location estimation unit 132 considers that the estimation accuracy of the time-series information self-location is to decrease since the self-location greatly changes, and estimates the self-location from only the current information self-location, even if a position change of the mobile object 11 is not detected on the basis of the detection result supplied from the sensor group 112. This may be a case where, for example, the mobile object 11 is a car and moves while being mounted on a car ferry boat. By doing this way, the self-location is estimated from only the current information self-location even when there is a position change unpredictable in advance and the self-location greatly changes regardless of the presence or absence of an influence of an external force. Therefore, the self-location can be estimated with a predetermined accuracy. Note that a detailed configuration of the self-location estimation unit 132 will be described later with reference to FIG. 4.

The situation analysis unit 133 performs analysis processing on a situation of the mobile object and the surroundings. The situation analysis unit 133 includes the map analysis unit 151, the situation recognition unit 152, and a situation prediction unit 153.

While using data or a signal from each unit of the mobile object control system 100 such as the self-location estimation unit 132 and the mobile-object external information detection unit 141 as necessary, the map analysis unit 151 performs analysis processing on various maps stored in the storage unit 109, and constructs a map including information necessary for processing of autonomous movement. The map analysis unit 151 supplies the constructed map to the situation recognition unit 152, the situation prediction unit 153, and a route planning unit 161, an action planning unit 162, and an operation planning unit 163 of the planning unit 134, and the like.

The situation recognition unit 152 performs situation recognition processing related to the mobile object, on the basis of data or a signal from each unit of the mobile object control system 100 such as the self-location estimation unit 132, the mobile-object external information detection unit 141, the mobile-object internal information detection unit 142, the mobile-object state detection unit 143, and the map analysis unit 151. For example, the situation recognition unit 152 performs recognition processing on a situation of the mobile object, a situation around the mobile object, a situation of a driver of the mobile object, and the like. Furthermore, the situation recognition unit 152 generates a local map (hereinafter, referred to as a situation recognition map) used for recognizing a situation around the mobile object, as necessary. The situation recognition map is, for example, an occupancy grid map, a lane map, or a point cloud map.

The situation of the mobile object to be recognized includes, for example, a location, a position, and a motion (for example, a velocity, an acceleration, a moving direction, and the like) of the mobile object, the presence/absence and contents of an abnormality, and the like. The situation around the mobile object to be recognized includes, for example, a type and a location of a surrounding stationary object, a type, a location, and a movement (for example, a velocity, an acceleration, a moving direction, and the like) of a surrounding moving object, a configuration of a surrounding road and a condition of a road surface, surrounding weather, temperature, humidity, and brightness, and the like. The driver's state to be recognized includes, for example, a physical condition, an awakening degree, a concentration degree, a fatigue degree, movement of a line-of-sight, driving operation, and the like.

The situation recognition unit 152 supplies data indicating a result of the recognition processing (including the situation recognition map as necessary) to the self-location estimation unit 132, the situation prediction unit 153, and the like. Furthermore, the situation recognition unit 152 causes the storage unit 109 to store the situation recognition map.

The situation prediction unit 153 performs prediction processing on a situation related to the mobile object, on the basis of data or a signal from each unit of the mobile object control system 100 such as the map analysis unit 151 and the situation recognition unit 152. For example, the situation prediction unit 153 performs prediction processing on a situation of the mobile object, a situation around the mobile object, a situation of a driver, and the like.

The situation of the mobile object to be predicted includes, for example, a behavior of the mobile object, an occurrence of an abnormality, a movable distance, and the like. The situation around the mobile object to be predicted includes, for example, a behavior of a moving object around the mobile object, a change in a signal state, a change in an environment such as weather, and the like. The situation of the driver to be predicted includes, for example, a behavior, a physical condition, and the like of the driver.

The situation prediction unit 153 supplies data indicating a result of the prediction processing, together with data from the situation recognition unit 152, to the route planning unit 161, the action planning unit 162, and the operation planning unit 163 of the planning unit 134, and the like.

The route planning unit 161 plans a route to a destination on the basis of data or a signal from each unit of the mobile object control system 100 such as the map analysis unit 151 and the situation prediction unit 153. For example, the route planning unit 161 sets a route from a current location to a designated destination on the basis of the global map. Furthermore, for example, the route planning unit 161 changes a route as appropriate on the basis of a situation such as traffic congestion, an accident, traffic restriction, and construction, a physical condition of the driver, and the like. The route planning unit 161 supplies data indicating the planned route to the action planning unit 162 and the like.

The action planning unit 162 plans an action of the mobile object for safely moving on the route planned by the route planning unit 161 within a planned time, on the basis of data or a signal from each unit of the mobile object control system 100 such as the map analysis unit 151 and the situation prediction unit 153. For example, the action planning unit 162 plans start, stop, a traveling direction (for example, forward, backward, left turn, right turn, direction change, and the like), a moving speed, overtaking, and the like. The action planning unit 162 supplies data indicating the planned action of the mobile object to the operation planning unit 163 and the like.

More specifically, for each of the routes planned by the route planning unit 161, the action planning unit 162 generates a candidate for an action plan of the mobile object for safely moving within a planned time, as an action plan candidate. More specifically, the action planning unit 162 generates an action plan candidate by, for example, an A* algorithm (A-star search algorithm) that sections an environment into a grid and optimizes arrival determination and a route weight to generate a best path, a lane algorithm that sets a route in accordance with a road center line, a rapidly-exploring random tree (RRT) algorithm that suitably prunes and extends a path from a self-location to a location that can be reached incrementally, and the like.

The operation planning unit 163 plans an operation of the mobile object for realizing an action planned by the action planning unit 162, on the basis of data or a signal from each unit of the mobile object control system 100 such as the map analysis unit 151 and the situation prediction unit 153. For example, the operation planning unit 163 plans acceleration, deceleration, a movement trajectory, and the like. The operation planning unit 163 supplies data indicating the planned operation of the mobile object to the operation control unit 135 and the like.

The operation control unit 135 controls an operation of the mobile object.

More specifically, the operation control unit 135 performs detection processing on an emergency situation such as a collision, contact, entry into a danger zone, a driver abnormality, and a mobile object abnormality, on the basis of a detection result of the mobile-object external information detection unit 141, the mobile-object internal information detection unit 142, and the mobile-object state detection unit 143. In a case of detecting an occurrence of an emergency, the operation control unit 135 plans an operation of the mobile object to avoid an emergency, such as a sudden stop or a sharp turn.

Furthermore, the operation control unit 135 performs acceleration and deceleration control for realizing an operation of the mobile object planned by the operation planning unit 163. For example, the operation control unit 135 calculates a control target value of the driving force generation device or the braking device to achieve a planned acceleration and deceleration or a sudden stop, and supplies a control command indicating the calculated control target value to the driving system control unit 107.

The operation control unit 135 performs direction control for realizing an operation of the mobile object planned by the operation planning unit 163. For example, the operation control unit 135 calculates a control target value of the steering mechanism to achieve a moving trajectory planned by the operation planning unit 163 or a sharp turn, and supplies a control command indicating the calculated control target value to the driving system control unit 107.

<Detailed Configuration Example of Recognition Processing Unit>

Figure 4:
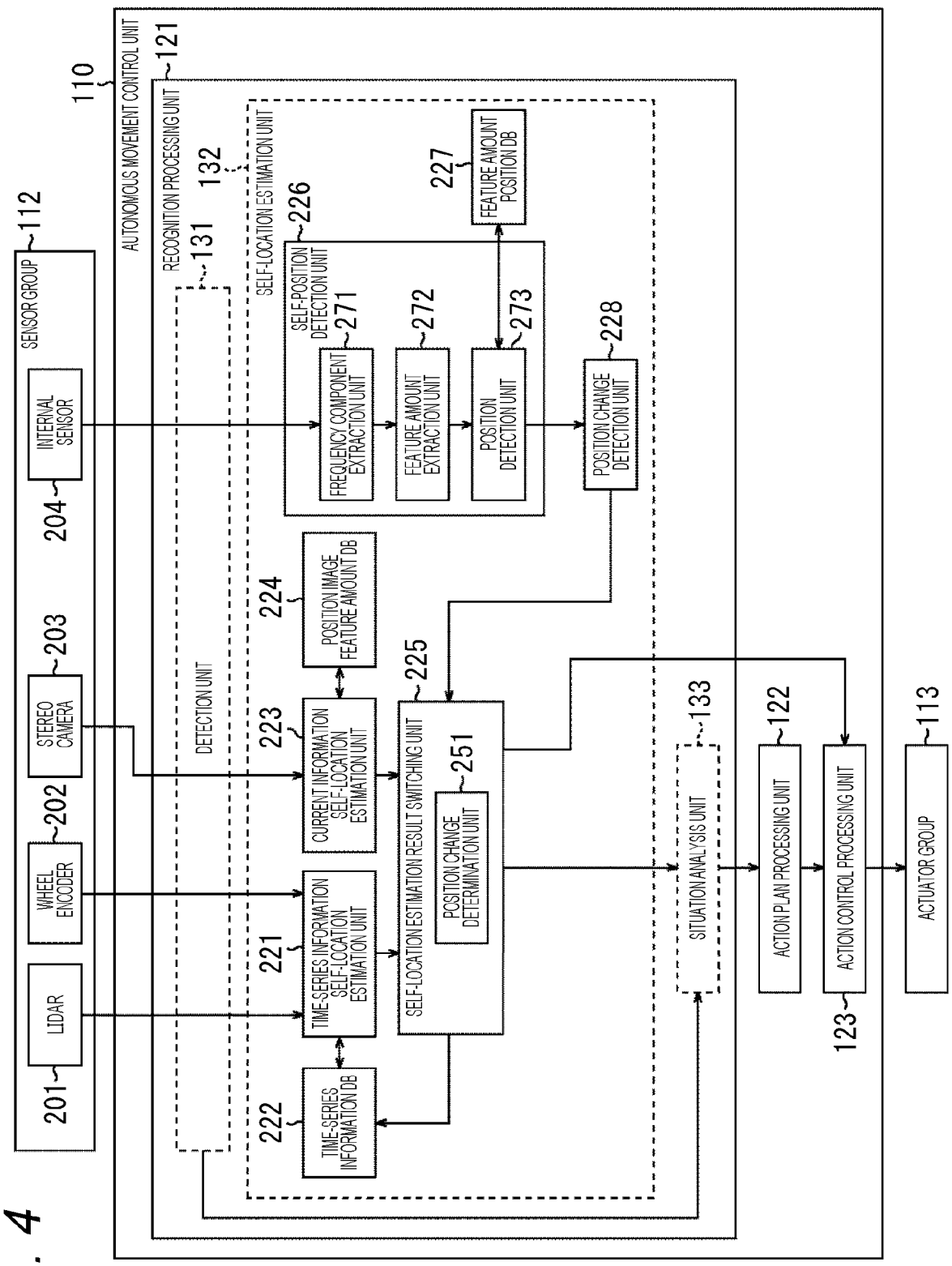
FIG. 4 is a detailed block diagram of a configuration example of a recognition processing unit and a peripheral thereof according to a preferred embodiment of the present disclosure.

Next, with reference to FIG. 4, a description is given to a specific configuration example of the recognition processing unit 121 of the autonomous movement control unit 110 corresponding to the recognition processing unit 31, and a peripheral, in the mobile object control system 100 in FIG. 3.

Note that, here, an example will be described in which the mobile object is the mobile object 11 including a wheel-type mobile robot, but the mobile object may be another robot, a car, or the like.

The sensor group 112 includes LIDAR 201, a wheel encoder 202, a stereo camera 203, and an internal sensor 204. Naturally, other sensors may be used in a case of a four-legged walking robot, a car, or the like.

The LIDAR 201 acquires a distance to an object around the mobile object 11 as three-dimensional point cloud data, and outputs as time-series information to a time-series information self-location estimation unit 221 of the self-location estimation unit 132, via the detection unit 131.

The wheel encoder 202 detects location information (X, Y, Z), a position (quaternion), a velocity (dx, dy, dz), an acceleration (ax, ay, az), and an angular velocity (wx, wy, wz) of the mobile object 11, and outputs as time-series information to the time-series information self-location estimation unit 221 via the detection unit 131.

The stereo camera 203 captures a parallax image of surroundings of the mobile object 11, and outputs as current information to a current information self-location estimation unit 223 via the detection unit 131.

The internal sensor 204 is a generic term for an acceleration sensor, a gyro sensor, a geomagnetic sensor, and the like, detects an acceleration, an angle, an angular velocity, a geomagnetic direction, and the like of the mobile object 11, and outputs to the self-location estimation unit 132 via the detection unit 131.

The self-location estimation unit 132 includes the time-series information self-location estimation unit 221, a time-series information DB 222, the current information self-location estimation unit 223, a position image feature amount DB 224, a self-location estimation result switching unit 225, a self-position detection unit 226, a feature amount position DB 227, and a position change detection unit 228.

The time-series information self-location estimation unit 221 stores, in the time-series information DB 222, time-series information such as three-dimensional point cloud data supplied by the LIDAR 201 and the wheel encoder 202 and expressing a self-location and a location of a surrounding obstacle.

Furthermore, the time-series information self-location estimation unit 221 reads time-series information of the past to the present as necessary from the time-series information DB 222, estimates the self-location on the basis of the read time-series information from the past to the present, and supplies to the self-location estimation result switching unit 225.

Note that, for a specific self-location estimation method using a simultaneous localisation and mapping (SLAM) by the time-series information self-location estimation unit 221, please refer to "Simultaneous Localization and Mapping Problem using Extended Kalman Filter" by Yusuke Morimoto and Toru Namerikawa, "Simultaneous Localisation and Mapping (SLAM): Part I The Essential Algorithms by Hugh Durrant-Whyte, Fellow, IEEE, and Tim Bailey", and "Simultaneous Localisation and Mapping (SLAM): Part II State of the Art by Tim Bailey and Hugh Durrant-Whyte". Note that the self-location estimated by the time-series information self-location estimation unit 221 on the basis of the time-series information is referred to as time-series information self-location.

The current information self-location estimation unit 223 generates a depth image (distance image) on the basis of a parallax image supplied from the stereo camera 203, and extracts an image feature amount from the depth image. Then, from the position image feature amount DB 224 in which a location and an image feature amount are stored in association with each other, the current information self-location estimation unit 223 estimates the self-location on the basis of information on a location corresponding to the extracted feature amount, and supplies to the self-location estimation result switching unit 225. Note that the self-location estimated by the current information self-location estimation unit 223 on the basis of the current information is referred to as a current information self-location.

The self-position detection unit 226 detects the self-position of the mobile object 11 on the basis of a detection result supplied from the internal sensor 204, and outputs to the position change detection unit 228.

More specifically, the self-position detection unit 226 includes a frequency component extraction unit 271, a feature amount extraction unit 272, and a position detection unit 273.

The frequency component extraction unit 271 extracts a frequency component of vibration of the mobile object 11 on the basis of a detection result of the internal sensor 204 by, for example, fast Fourier transform (FFT), and outputs to the feature amount extraction unit 272.

The feature amount extraction unit 272 extracts a feature amount from the frequency component of the vibration of the mobile object 11 supplied from the frequency component extraction unit 271, and outputs to the position detection unit 273.

The position detection unit 273 accesses the feature amount position DB 227 in which a feature amount and a position are registered in association with each other in advance by learning, extracts a position registered in association on the basis of the extracted feature amount, and outputs to the position change detection unit 228 as information on a current position of the mobile object 11. The information on the position detected by the position detection unit 273 on the basis of the feature amount includes at least three types of positions: a normal walking state, lifting, and a stationary state.

More specifically, a traveling state of the mobile object 11 and a so-called lifted state (kidnap state) in which the mobile object 11 is suddenly lifted can be identified, for example, on the basis of a vertical acceleration and a power spectrum that is a frequency analysis result thereof.

Figure 5:
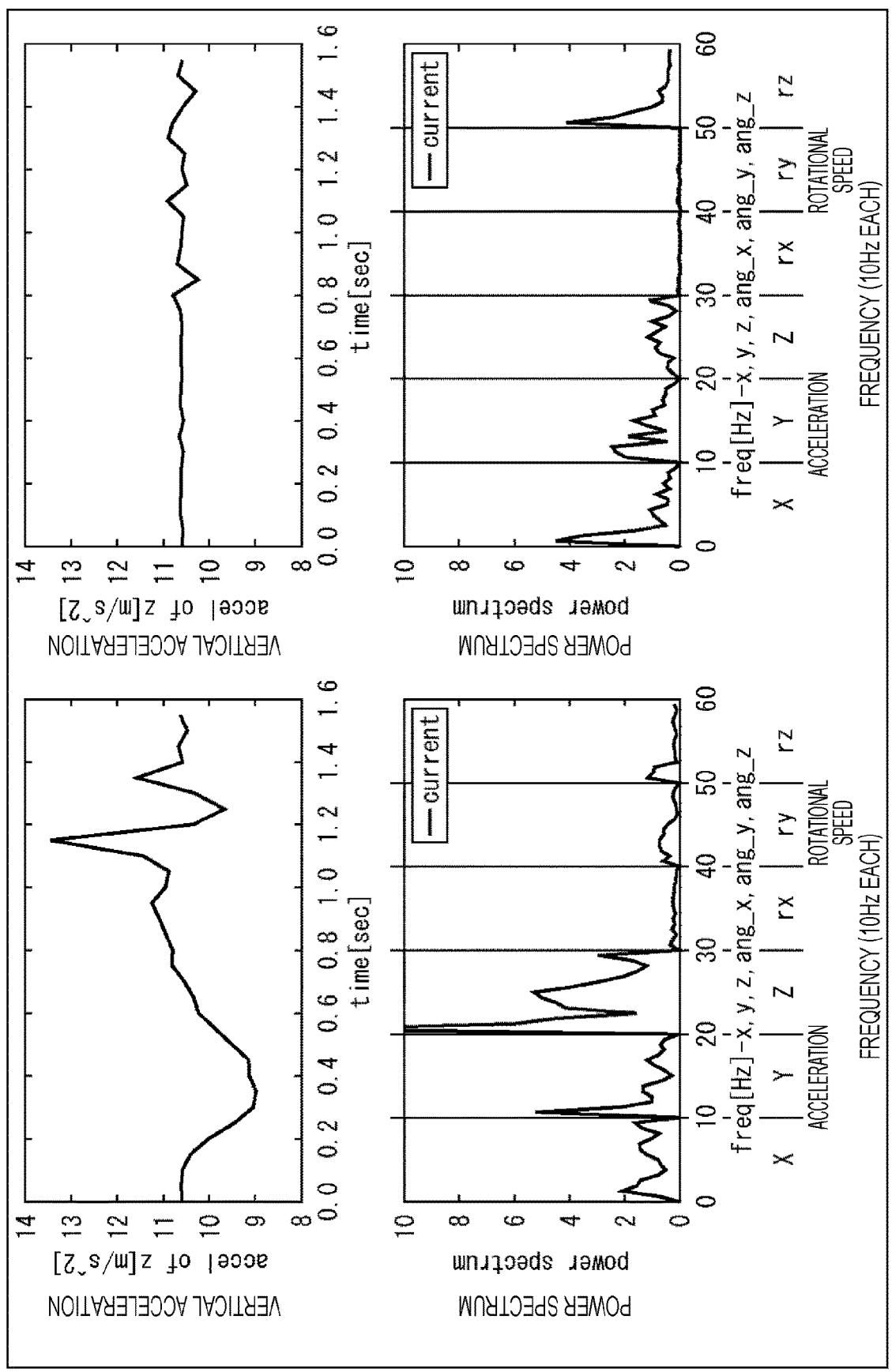
FIG. 5 is a graph for explaining position detection.

An upper part in FIG. 5 shows a vertical acceleration, and shows a displacement for 1.6 seconds when an output of the internal sensor 204 is 20 Hz, that is, for 32 elements, in which a horizontal axis indicates time, and a vertical axis indicates an acceleration.

Furthermore, a lower part in FIG. 5 is an acceleration in an x direction (x), a y direction (y), and a z (z) direction from the left, and is a power spectrum for each rotational speed in the x direction (rx), the y direction (ry), and the z direction (zy), in which a horizontal axis indicates a frequency (Hz: 10 Hz each), and a vertical axis indicates each power spectrum. Here, the x and y directions are a horizontal coordinate system, and the z direction is a perpendicular (vertical) coordinate system.

Moreover, the upper part and the lower part of on the left in FIG. 5 both show a waveform in a lifted state (kidnap state), and the upper part and the lower part of on the right in FIG. 5 both show a waveform in a traveling state.

The waveform as shown in the lower part in FIG. 5 is obtained by performing frequency analysis using FFT on the waveform as shown in the upper part in FIG. 5.

As shown in the upper right part in FIG. 5, it is indicated that the vertical acceleration does not change in the traveling state. Whereas, in the lifted state, after having decreased around 0.4 second, there is a great change in a range of 1.1 to 1.4 seconds as shown in the upper left part in FIG. 5.

As a result, in the power spectrum, a large change appears in the z direction in particular, which is the vertical direction. The change is almost about 1.0 or less on average over the entire range in the traveling state, but is a large value exceeding almost 2.5 on average in a range up to 2.5 Hz in the lifted state. Furthermore, in the x and y directions in the lifted state, the average is almost 1.0 or more in a range up to 2.5 Hz, and the average is almost 2.0 or less in a range of 5 Hz to 10 Hz. Whereas, in the x and y directions in the traveling state, the average is almost 2.0 or more in a range up to 2.5 Hz and the average is 1.0 or less in a range of 5 Hz to 10 Hz.

Therefore, in the x and y directions in the lifted state, the power spectrum is 2.5 or more in the range up to 2.5 Hz in the z direction, becomes almost 1.0 or more on average in the range up to 2.5 Hz, and the becomes almost 2.0 or less on average in the range of 5 Hz to 10 Hz.

In other words, such a distribution of the power spectrum in every frequency band in the x, y, and z directions is to be a feature amount in the lifted state.

Note that the position detection method may be another method, for example, please refer to "Gesture Recognition using Gyroscopes and Accelerometers, by Takashi Itaguchi, Tsutomu Kanamori, Haruhiro Katayose, Kosuke Sato, and Seiji Inokuchi" and "Learning Activity Recognition Models with Physical Characteristics Data of Users, by Takuya Maekawa, Shinji Watanabe".

The feature amount and the position are registered in association with each other in the feature amount position DB 227 in this manner. Therefore, the position detection unit 273 accesses the feature amount position DB 227 and detects a position registered in association with the feature amount obtained from the frequency analysis result.

Figure 6:
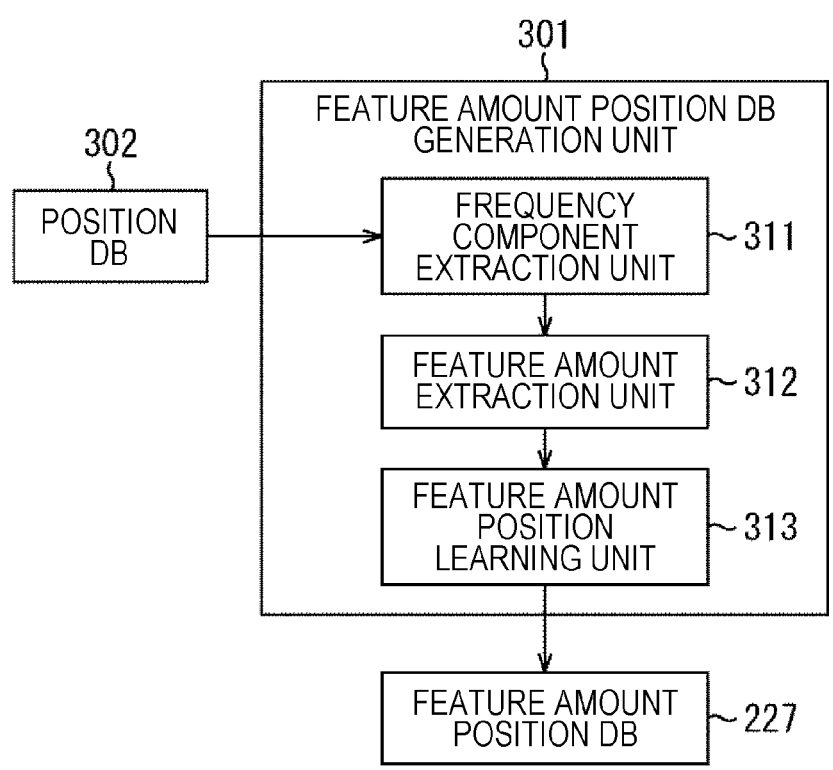
FIG. 6 is a configuration example of a feature amount position DB generation unit that generates a feature amount position DB in FIG. 4.

Note that a feature amount position DB generation unit 301 (FIG. 6) that generates the feature amount position DB 227 will be described later in detail with reference to FIG. 6.

The position change detection unit 228 acquires position information outputted from the self-position detection unit 226, detects the presence or absence of a position change, and outputs a detection result to the self-location estimation result switching unit 225. More specifically, the position change detection unit 228 detects at least three types of position changes of the mobile object 11, that is, a normal walking state, lifting, and a stationary state, and outputs a detection result to the self-location estimation result switching unit 225.

The self-location estimation result switching unit 225 switches or integrates the time-series information self-location estimation supplied from the time-series information self-location estimation unit 221 and the current information self-location estimation supplied from the current information self-location estimation unit 223, and outputs to the situation analysis unit 133 as a self-location estimation result.

Furthermore, the self-location estimation result switching unit 225 includes a position change determination unit 251, determines whether or not it is notified that a position change has been detected from the position change detection unit 228, and resets and deletes all the time-series information stored in the time-series information DB 222 when it is notified that a position change has been detected.

<Configuration Example of Feature Amount Position DB Generation Unit>

Next, a configuration example of the feature amount position DB generation unit 301 that generates the feature amount position DB 227 in FIG. 4 will be described with reference to FIG. 6.

On the basis of information of a position DB 302 in which a detection result of the internal sensor 204 in which a past position is known is registered, the feature amount position DB generation unit 301 learns a relationship with a feature amount extracted from a detection result for each position, and registers in the feature amount position DB 227.

More specifically, the feature amount position DB generation unit 301 includes a frequency component extraction unit 311, a feature amount extraction unit 312, and a feature amount position learning unit 313.

The frequency component extraction unit 311 is a configuration corresponding to the frequency component extraction unit 271, and reads a detection result of the internal sensor 204 in which a past position is known, from the position DB 302. Then, the frequency component extraction unit 311 analyzes and extracts a frequency component of vibration, which is the read detection result, for example, by applying fast Fourier transform (FFT), and outputs to the feature amount extraction unit 312 together with the position information.

The feature amount extraction unit 312 is a configuration corresponding to the feature amount extraction unit 272, extracts a feature amount from the frequency component supplied from the frequency component extraction unit 311, and outputs to the feature amount position learning unit 313 together with the position information.

The feature amount position learning unit 313 learns a relationship between a position known in advance and a corresponding feature amount, and associates and registers the relationship between the position and the feature amount obtained as a learning result in the feature amount position DB 227.

<Time-Series Information Self-Location Estimation Process>

Figure 7:
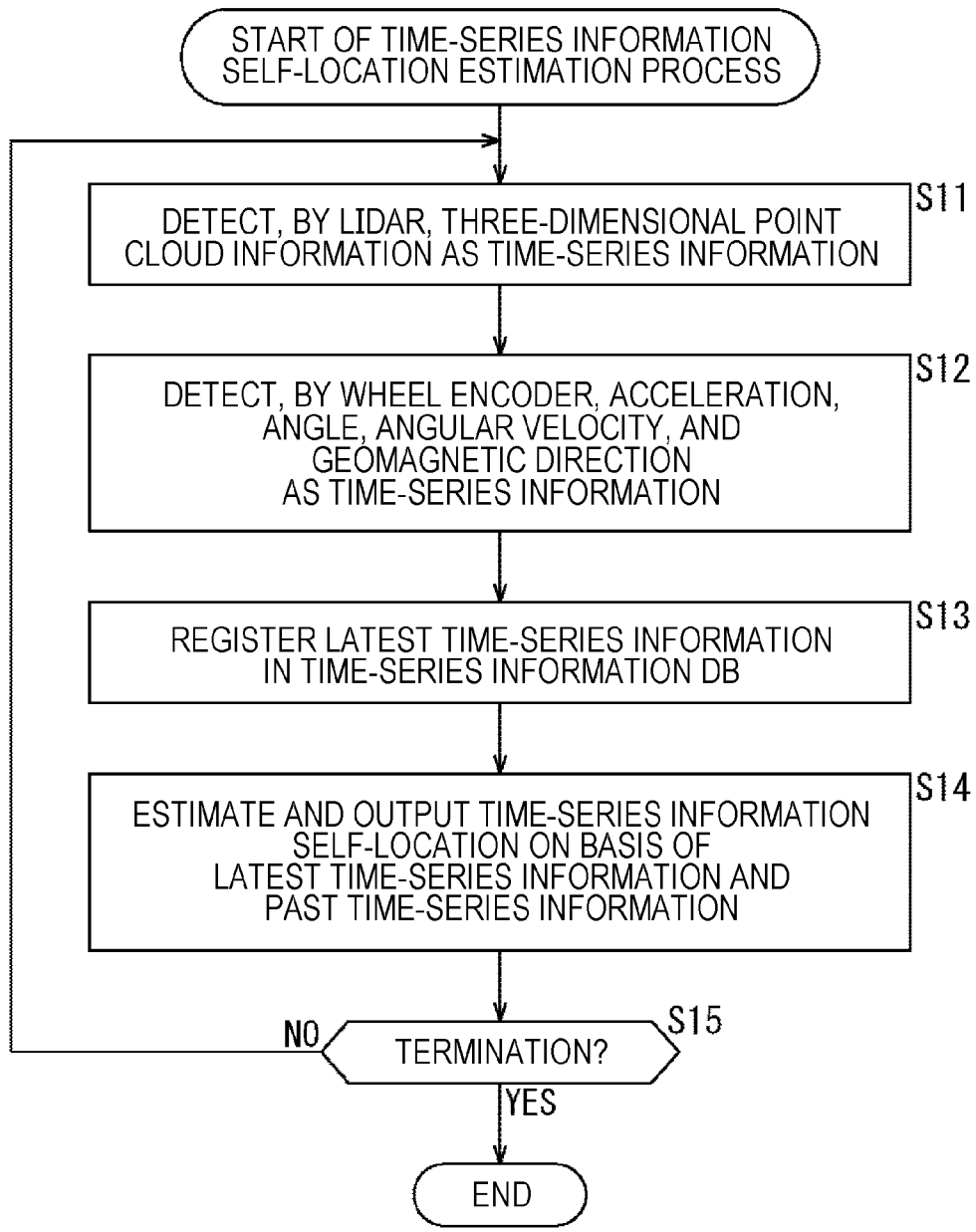
FIG. 7 is a flowchart for explaining a time-series information self-location estimation process.

Next, a time-series information self-location estimation process will be described with reference to a flowchart in FIG. 7.

In step S11, the LIDAR 201 acquires a distance to an object around the mobile object 11 as three-dimensional point cloud data, and outputs as time-series information to the time-series information self-location estimation unit 221 of the self-location estimation unit 132, via the detection unit 131.

In step S12, the wheel encoder 202 detects location information, a position, a velocity, an acceleration, and an angular velocity of the mobile object 11, and outputs as time-series information to the time-series information self-location estimation unit 221 via the detection unit 131.

In step S13, the time-series information self-location estimation unit 221 acquires latest time-series information, and registers in the time-series information DB 222.

In step S14, the time-series information self-location estimation unit 221 estimates a self-location, for example, by SLAM from the latest time-series information and past time-series information registered in the time-series information DB 222, and outputs an estimation result to the self-location estimation result switching unit 225 as time-series information self-location information.

In step S15, the time-series information self-location estimation unit 221 determines whether or not termination of the process has been instructed, and the process returns to step S11 in a case of not termination.

Then, in step S15, in a case where termination of the process is instructed, the process is terminated.

By the above processing, the time-series information detected by the LIDAR 201 and the wheel encoder 202 is sequentially detected, and sequentially accumulated in the time-series information DB 206. Further, on the basis of the time-series information accumulated in a time series from the past to the present accumulated in a time series, a time-series information self-location is estimated, and repeatedly outputted to the self-location estimation result switching unit 225.

<Current Information Self-Location Estimation Process>

Figure 8:
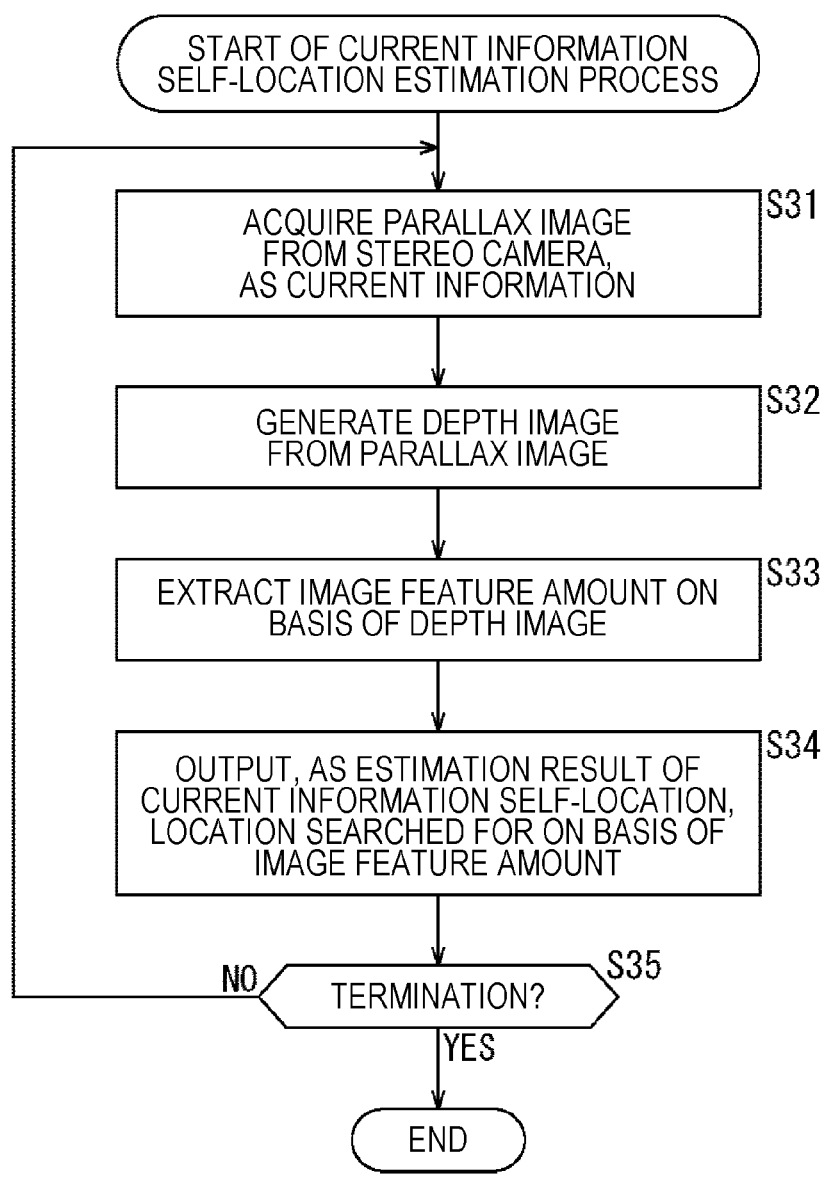
FIG. 8 is a flowchart for explaining a current information self-location estimation process.

Next, a current information self-location estimation process will be described with reference to a flowchart in FIG. 8.

In step S31, the stereo camera 203 captures a parallax image of surroundings of the mobile object 11, and outputs as current information to the current information self-location estimation unit 223 via the detection unit 131.

In step S32, the current information self-location estimation unit 223 generates a depth image (distance image) on the basis of a parallax image supplied from the stereo camera 203.

In step S33, the current information self-location estimation unit 223 extracts an image feature amount from the generated depth image.

In step S34, from the position image feature amount DB 224 in which a location and an image feature amount are stored in association with each other, the current information self-location estimation unit 223 estimates a self-location by detecting information on a location corresponding to the extracted image feature amount, and supplies an estimation result as a current information self-location to the self-location estimation result switching unit 225.

In step S35, the current information self-location estimation unit 223 determines whether or not termination of the process has been instructed, and the process returns to step S31 in a case of not termination.

Then, in step S35, in a case where termination of the process is instructed, the process is terminated.

By the above processing, a parallax image is captured as current information by the stereo camera 203, a depth image is generated from the parallax image as the current information, an image feature amount of the generated depth image is extracted, and a current information self-location is estimated on the basis of the location information registered in association with the image feature amount and is repeatedly outputted to the self-location estimation result switching unit 225.

<Position Change Detection Process>

Figure 9:
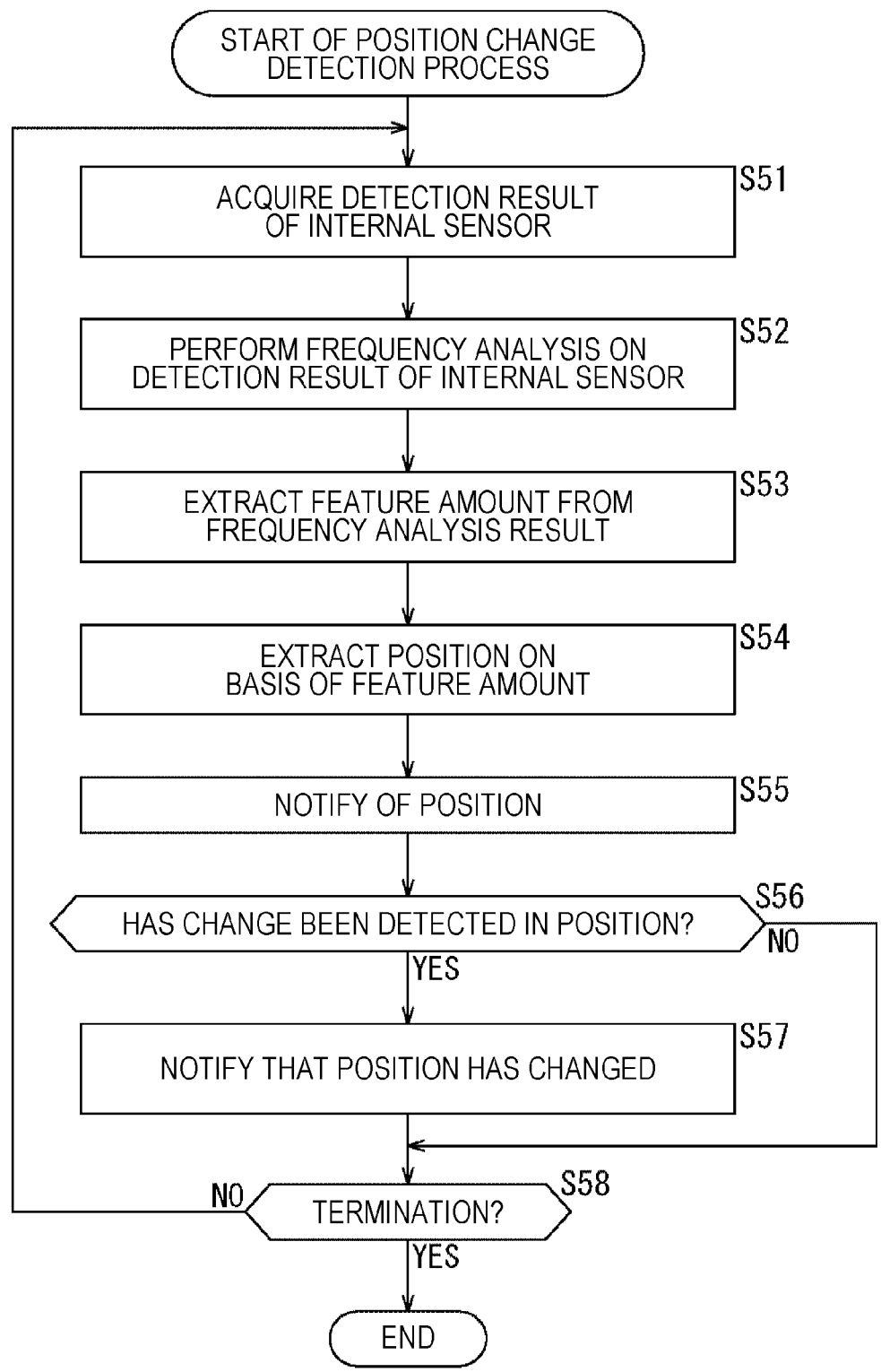
FIG. 9 is a flowchart for explaining a position change detection process.

Next, a position change detection process will be described with reference to a flowchart in FIG. 9.

In step S51, the internal sensor 204 detects an acceleration, an angle, an angular velocity, a geomagnetic direction, and the like of the mobile object 11, and outputs to the self-position detection unit 226 of the self-location estimation unit 132 via the detection unit 131.

In step S52, the frequency component extraction unit 271 of the self-position detection unit 226 performs frequency analysis by applying FFT on detection results of the acceleration, the angle, the angular velocity, and the geomagnetic direction detected by the internal sensor 204, and outputs an analysis result to the feature amount extraction unit 272.

In step S53, the feature amount extraction unit 272 extracts a feature amount from the frequency analysis result, and outputs to the position detection unit 273.

In step S54, the position detection unit 273 accesses the feature amount position DB 227 as described with reference to FIG. 5, searches for information on a corresponding position on the basis of the feature amount, detects a search result as a current position, and outputs to the position change detection unit 228.

In step S55, the position change detection unit 228 stores the new current position information supplied from the self-position detection unit 226, and gives a notification to the self-location estimation result switching unit 225.

In step S56, the position change detection unit 228 compares the new current position information supplied from the self-position detection unit 226 with position information stored immediately before, and determines whether or not a change has occurred in the position.

In a case where it is considered in step S56 that the position immediately before is different from the current position and a change has occurred, the process proceeds to step S57.

In step S57, the position change detection unit 228 notifies the self-location estimation result switching unit 225 that the position has changed.

Whereas, in a case where no position change is detected in step S56, the processing in step S57 is skipped.

In step S58, the self-position detection unit 226 determines whether or not termination of the process has been instructed, and the process returns to step S51 in a case of not termination. In other words, until termination is instructed, the processing in steps S51 to S58 is repeated to detect the self-position, and to continuously detect the presence or absence of a change.

Then, in step S58, in a case where termination of the process is instructed, the process is terminated.

By the above processing, a position of the mobile object 11 is detected, and information on the detected position is notified to the self-location estimation result switching unit 225. Furthermore, information on the detected position is sequentially stored, and it is determined whether or not the position has changed by comparing the information on the detected current position with a position stored immediately before. In a case where a position change is detected, the self-location estimation result switching unit 225 is notified that the position change has been detected.

<Autonomous Movement Control Process>

Next, an autonomous movement control process in the mobile object control system 100 in FIG. 4 will be described with reference to a flowchart in FIG. 10.

In step S71, the position change determination unit 251 of the self-location estimation result switching unit 225 determines whether or not it is notified that there has been detected a position change of changing to a position indicating a lifted state (kidnap state), which is detected by the position change detection process.

In a case where the position change of changing to the position indicating a lifted state (kidnap state) is detected in step S71, the process proceeds to step S72.

In step S72, the self-location estimation result switching unit 225 outputs an instruction to the action control processing unit 123 to stop the mobile object 11 for a predetermined time. Accordingly, the action control processing unit 123 controls the actuator group 113 to stop the operation of the mobile object 11 for a predetermined time.

In step S73, after the predetermined time has elapsed and the stop of the operation has been canceled, the self-location estimation result switching unit 225 resets past time-series information registered in the time-series information DB 222.

Note that, in a case where it is considered in step S71 that the position change has not been detected, the processing in steps S72 and S73 is skipped. In other words, in this case, the registered state of the past time-series information registered in the time-series information DB 222 is maintained without being reset. Furthermore, when the lifted state is detected, all the information of the time-series information registered in the time-series information DB 222 is deleted and reset since the self-location cannot be estimated using the past time-series information.

In step S74, the self-location estimation result switching unit 225 outputs a time-series information self-location, which is an estimation result of the time-series information self-location estimation unit 221, to the situation analysis unit 133 as a self-location estimation result.

In step S75, the situation analysis unit 133 analyzes a situation around the self-location on the basis of the self-location estimation result, and outputs an analysis result to the action plan processing unit 122.

In step S76, the action plan processing unit 122 plans a route to a destination on the basis of the analysis result of the surroundings based on a self-location estimation result, determines an action plan on the basis of the planned route, generates an operation plan for controlling the actuator group 113, and outputs to the action control processing unit 123.

In step S77, the action control processing unit 123 controls the actuator group 113 on the basis of the operation plan supplied from the operation planning unit 163.

In step S78, the autonomous movement control unit 110 determines whether or not termination has been instructed, and the process returns to step S71 in a case where termination has not been instructed. In other words, the processing in steps S71 to S78 is repeated. Then, in a case where termination is instructed in step S78, the process is terminated.

By the above processing, since the past time-series information registered in the time-series information DB 222 is not reset in a case where the position change of changing to the lifted state due to an influence of an external force and the like is not detected, the time-series information self-location estimated using all the highly reliable time-series information from the present to the past is outputted as a self-location estimation result.

Whereas, in a case of detecting a position change unpredictable in advance that causes the lifted state due to an influence of an external force and the like, relatively unreliable past time-series information registered in the time-series information DB 222 is reset and deleted, and the time-series information self-location estimated using relatively new time-series information from a later timing from a timing when the position change to the lifted state has been detected is outputted as a self-location estimation result.

In other words, in accordance with the presence or absence of the position change unpredictable in advance that causes the lifted state due to an influence of an external force and the like, switching is performed between a first estimation model for estimating a time-series information self-location by using all the time-series information from the past to the present, and a second estimation model for estimating a time-series information self-location by using the relatively new time-series information after the time-series information DB 222 is reset at the timing when the position change to the lifted state is detected.

Therefore, in a case where the position change due to an external force such as the lifted state is not detected, time-series information having high continuity in a time series from the past to the present, time-series information from the past to the present can be used for the time-series information DB 222, to estimate the time-series information self-location with high accuracy.

Whereas, in a case where the position change unpredictable in advance such as the lifted state is detected, the time-series information registered in the time-series information DB 222 is reset. Therefore, it is possible to estimate the time-series information self-location on the basis of relatively new and highly reliable time-series information in and after the lifted state, excluding past time-series information that cannot be used, since the self-location immediately before is changed due to an external force such as lifting, for example. Furthermore, the time-series information registered in the time-series information DB 222 gradually increases over time even after the reset, and therefore the reliability is to be improved.

As a result, highly reliable time-series information self-location can be estimated regardless of the presence or absence of the position change unpredictable in advance.

Note that, in the above, an example has been described in which the time-series information DB 222 is reset when the lifted state is detected as a position change from any position. However, the timing when the time-series information of the time-series information DB 222 is reset may be other than the lifted state. For example, the timing may be when a slip on a sole contact surface of a four-legged walking robot or a slip on a wheel of a wheel-type robot is detected in a case of a snowy road and a gravel road, for example, by detecting road surface conditions such as a paved road, a gravel road, a snowy road, a road surface wet with rain, stairs, a flat surface, and a traveling path without track maintenance, or the timing may be when getting on and off of a non-fixed object is detected. Furthermore, the timing may be when it is detected that a visual field is narrowed or lost due to an environmental change (electromagnetic noise, shadow of a thing) by statistically processing a detection result of a sensor, to detect an abnormality of the sensor on the basis of a change in a detection result. Moreover, in a case where the mobile object 11 is a car or the like, the timing may be when it is detected that a self-location or a position before and after boarding has changed more than a predetermined value by being mounted on a car ferry boat and moving. Furthermore, in a case where the mobile object 11 is a car or the like, the timing may be when it is detected that a self-location or a position has changed more than a predetermined value before and after repair of a puncture, when an engine is stopped due to a puncture of a tire. In other words, any other timings may be adopted as long as it is a timing when the position change unpredictable in advance is detected, such as a situation where continuity in a change in a time series of the self-location or the position is reduced (a state where the continuity is lost).

Furthermore, an example has been described in which, in step S74, the time-series information self-location estimated by the time-series information self-location estimation unit 221 is adopted as the self-location, but a result obtained by integrating both the time-series information self-location and the current information self-location by a Kalman filter, a particle filter, or the like may be outputted as a self-location estimation result.

Moreover, in the above, an example has been described in which a position is detected using a feature amount of the frequency component, but the position may be obtained as a probability or an accuracy. In this case, for a plurality of position changes, results for the respective positions may be merged using weights based on the respective probabilities or accuracies.

Furthermore, in the above, an example has been described in which, in a case where the mobile object 11 is a wheel-type mobile robot, information detected by the LIDAR 201 and the wheel encoder 202 is used as time-series information, and a parallax image captured by the stereo camera 203 is used as current information.

However, the time-series information and the current information are not limited to this, and may be in conformity with a form of the mobile object 11. In other words, in a case where the mobile object 11 is a drone, the time-series information may be information detected by the LIDAR and an inertial measurement unit (IMU) or an acceleration sensor, and the current information may be information acquired by the GNSS.

Furthermore, in a case where the mobile object 11 is a car, the time-series information may be information detected by the LIDAR, and the current information may be information acquired by the GNSS.

Moreover, in a case where the mobile object 11 is a multi-legged walking robot, the time-series information may be information detected by the LIDAR, the inertial measurement unit (IMU), and a sensor attached to the actuator, while the current information may be information acquired by a stereo camera, the inertial measurement unit (IMU), and a sensor attached to the actuator.

Furthermore, the LIDAR and the ToF sensor may be used instead of the stereo camera.

Moreover, in the above, a detection result of the internal sensor 204 (combination of an acceleration sensor and a gyro sensor) has been used for detection of a self-position by the self-position detection unit 226, a parallax image by the stereo camera 203 has been used for the current information self-location estimation by the current information self-location estimation unit 223, and a sensing result of the LIDAR 201 and the wheel encoder 202 has been used for the time-series information self-location estimation by the time-series information self-location estimation unit 221.

However, the sensing result supplied to each may be a detection result by other sensor, as long as the self-position detection unit 226 can detect the self-position, the current information self-location estimation unit 223 can perform current information self-location estimation, and the time-series information self-location estimation unit 221 can perform time-series information self-location estimation.

Furthermore, three-dimensional point cloud information, which is a sensing result of the LIDAR 201, may be supplied to each of the time-series information self-location estimation unit 221, the current information self-location estimation unit 223, and the self-position detection unit 226, to realize self-position detection, current information self-location estimation, and time-series information self-location estimation individually on the basis of the three-dimensional point cloud information. Moreover, a parallax image, which is a sensing result of the stereo camera 203, may be supplied to the time-series information self-location estimation unit 221, the current information self-location estimation unit 223, and the self-position detection unit 226, to realize self-position detection, current information self-location estimation, and time-series information self-location estimation individually on the basis of the parallax image.

<Feature Amount Position DB Learning Process>

Figure 11:
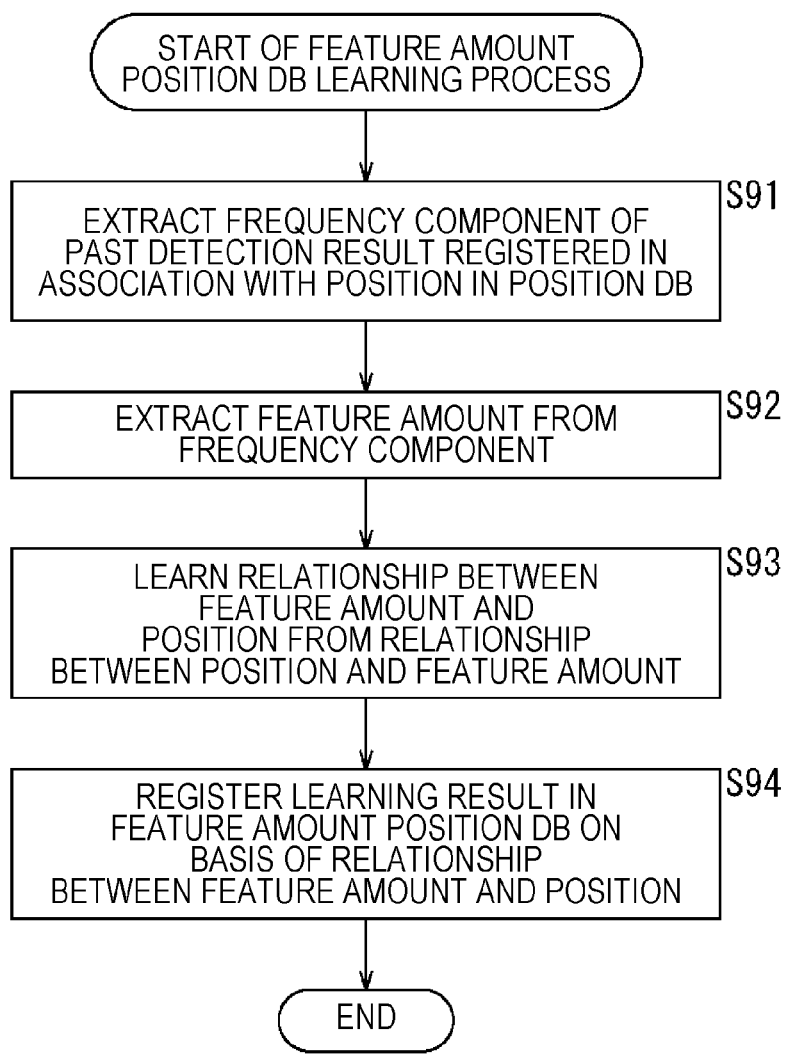
FIG. 11 is a flowchart for explaining a feature amount position DB learning process.

Next, a feature amount position DB learning process will be described with reference to a flowchart in FIG. 11.

In step S91, the frequency component extraction unit 311 reads a detection result of the internal sensor 204 in which a past position is known from the position DB 302, analyzes a frequency component of vibration with, for example, fast Fourier transform (FFT), and outputs to the feature amount extraction unit 312.

In step S92, the feature amount extraction unit 312 extracts a feature amount from the frequency component supplied from the frequency component extraction unit 311, and outputs to the feature amount position learning unit 313.

In step S93, the feature amount position learning unit 313 learns a relationship between a position known in advance and a corresponding feature amount by using, for example, a neural network or the like.

In step S94, the feature amount position learning unit 313 associates the relationship between the position and the feature amount of the frequency component obtained as a learning result, and registers in the feature amount position DB 227.

By the above processing, the feature amount of the frequency component and the position are associated with each other and registered in the feature amount position DB 227. As a result, the position can be detected from the feature amount of the frequency component.

3. First Modified Example

In the above, an example has been described in which time-series information registered in the time-series information DB 222 is reset in a case where the self-location is uncertain due to an influence of an external force. However, reliability of the time-series information is predicted to be low immediately after the self-location becomes uncertain. Therefore, after the self-location becomes uncertain and the time-series information is reset, a current information self-location may be adopted as a self-location estimation result until the reliability of the time-series information becomes higher than a predetermined value.

<Autonomous Movement Control Process of First Modified Example>

Figure 12:
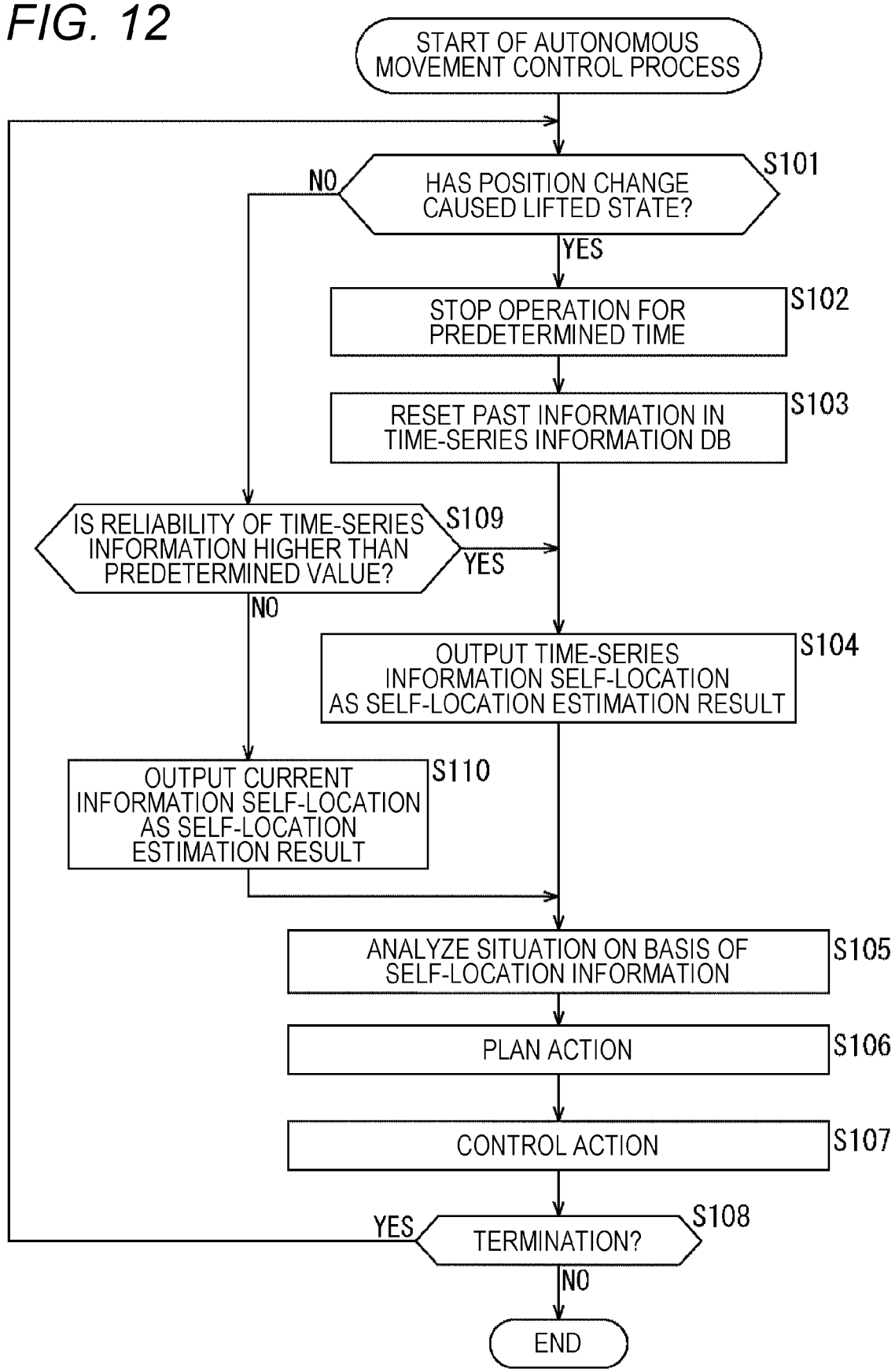
FIG. 12 is a flowchart for explaining an autonomous movement control process according to a first modified example.

Next, with reference to a flowchart in FIG. 12, a description is given to an autonomous movement control process in which a current information self-location is adopted as a self-location estimation result until reliability of the time-series information becomes higher than a predetermined value in the mobile object control system 100 in FIG. 4.

The reliability of the time-series information may be, for example, a value set on the basis of the number of pieces of information accumulated as the time-series information. In other words, since a time-series information self-location is estimated by using a plurality of pieces of information from past information to current information, the number of pieces of information that can be used for self-location estimation is to be an index of the reliability.

Another example of the reliability of time-series information may be, for example, a reciprocal of a time average of a distance difference between a result of the self-location estimation for the past x seconds calculated on the basis of the time-series information and an actual self-location for the past x seconds.

Figure 10:
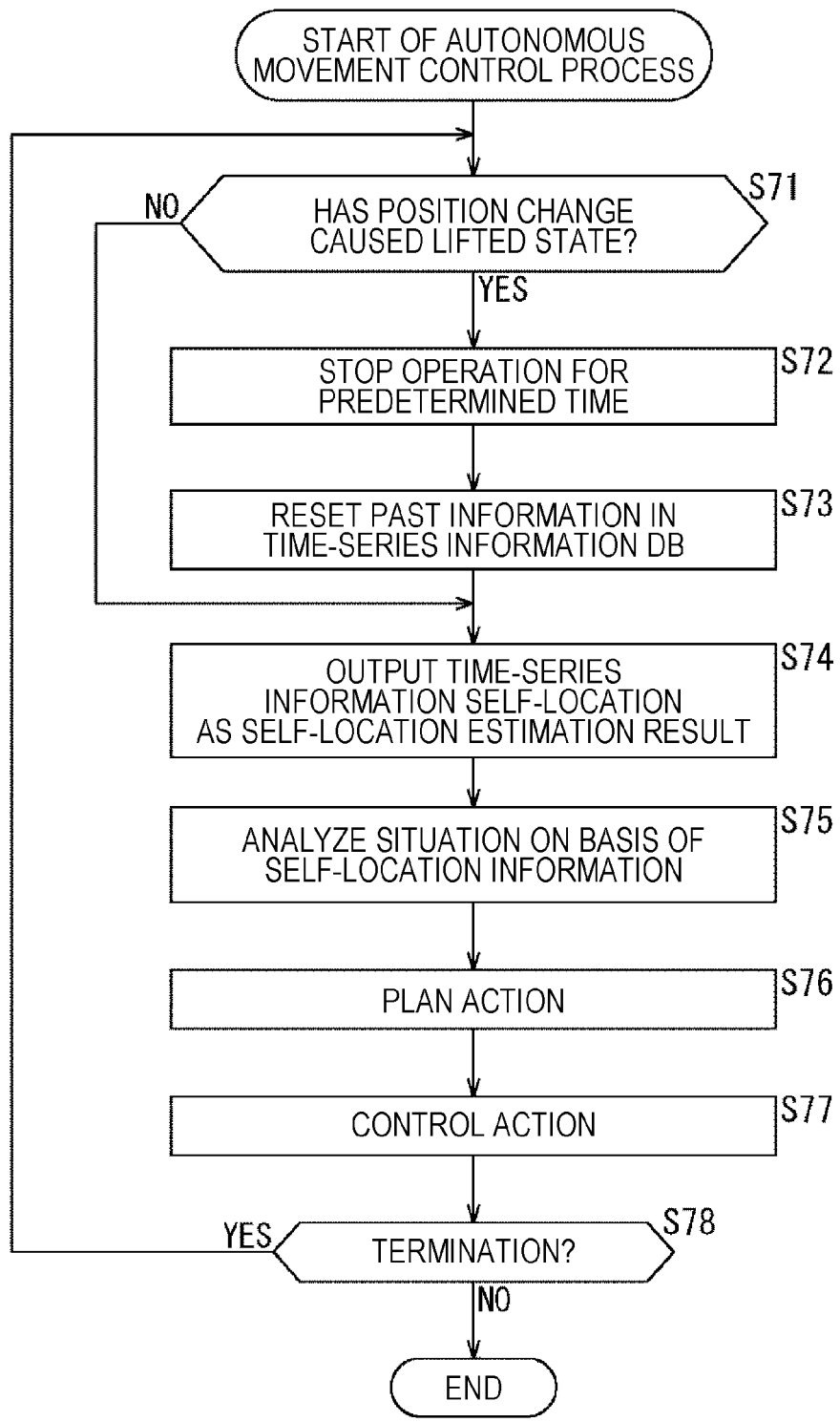
FIG. 10 is a flowchart for explaining an autonomous movement control process.

Note that the processing in steps S101 to S108 in the flowchart in FIG. 12 is similar to the processing in steps S71 to S78 in the flowchart in FIG. 10, and therefore a description thereof will be omitted.

In step S101, in a case where it is determined that the position has changed to a position indicating the lifted state due to an influence of an external force, in other words, in a case where it is determined that a position change unpredictable in advance has been detected, the process proceeds to step S109.

In step S109, for example, after the reset, the self-location estimation result switching unit 225 determines whether or not the reliability of the time-series information is higher than a predetermined threshold value on the basis of whether or not the number of pieces of time-series information newly registered in the time-series information DB 222 is larger than a predetermined number.

In step S109, in a case where the number of pieces of time-series information registered in the time-series information DB 222 is larger than the predetermined number and the reliability is considered to be higher than the predetermined value, the process proceeds to step S104.

In other words, in this case, since the reliability of the time-series information registered in the time-series information DB 222 is higher than the predetermined value, the time-series information self-location is adopted as a self-location estimation result in step S104.

Whereas, in step S109, in a case where the number of pieces of time-series information registered in the time-series information DB 222 is smaller than the predetermined number and the reliability is considered to be lower than the predetermined value at a timing near immediately after the reset is applied and the like, the process proceeds to step S110.

In step S110, the self-location estimation result switching unit 225 outputs a current information self-location, which is an estimation result of the current information self-location estimation unit 223, to the situation analysis unit 133 as a self-location estimation result.

By the above processing, since the past time-series information registered in the time-series information DB 222 is not reset in a case where the position change of changing to the lifted state due to an influence of an external force and the like is not detected, the time-series information self-location estimated using all the highly reliable time-series information from the present to the past is outputted as a self-location estimation result.

Whereas, in a case where the position change to the lifted state due to an influence of an external force and the like is detected, relatively unreliable past time-series information registered in the time-series information DB 222 is reset and deleted, and at the same time, a current information self-location estimated using the current information is outputted as a self-location estimation result.

In other words, depending on the presence or absence of the position change to the lifted state due to an influence of an external force and the like, switching is performed between a first estimation model for estimating a time-series information self-location by using all the time-series information from the past to the present, and a second estimation model for estimating the current information self-location by using the current information after the timing when the position change to the lifted state is detected.

Therefore, in a case where the position change due to an external force such as the lifted state is not detected, time-series information having high continuity in a time series from the past to the present, time-series information from the past to the present can be used for the time-series information DB 222, to estimate the time-series information self-location with high accuracy.

Whereas, in a case where the position change such as the lifted state due to an external force is detected, the current information self-location can be estimated on the basis of highly reliable current information.

Moreover, after the time-series information registered in the time-series information DB 222 is reset, when a predetermined time has elapsed, the time-series information is registered more than a predetermined number, and the reliability is restored, the estimation model returns to the first estimation model for estimating a time-series information self-location by using all the time-series information from the past to the present.

In any case, as a result, a highly reliable time-series information self-location can be estimated regardless of the presence or absence of the position change unpredictable in advance.

In other words, even after the time-series information registered in the time-series information DB 222 is reset, the current information self-location can be adopted as the self-location estimation result until the reliability becomes higher than a predetermined value, and it is possible to prevent a significant decrease in estimation accuracy due to the self-location estimation result based on the time-series information with low reliability.

Note that, in the above, an example has been described in which the current information self-location is adopt as a self-location estimation result until the reliability of the time-series information becomes higher than a predetermined value after the time-series information is reset.

However, in a case where the time-series information self-location is estimated using a Kalman filter that repeats a step of updating an observation value of a prior probability density distribution with latest time-series information, a weight of the latest time-series information may be maximized when a position change is detected, and then the time-series information self-location may be estimated using a normal Kalman filter.

Furthermore, after the time-series information is reset, among the time-series information registered in the time-series information DB 222, the self-location estimated for the latest time-series information may be obtained with a larger weight, while the self-location estimated on the basis of older time-series information may be obtained with a lighter and smaller weight. In this case, time-series information whose weight becomes 0 may be deleted from the time-series information DB 222. By doing this way, it becomes possible to realize a process similar to forgetting in memories of humans and the like, delete the time-series information registered in the time-series information DB 222 in order from the oldest one, and appropriately compress an information amount of the time-series information accumulated in the time-series information DB 222 while preventing a decrease in the estimation accuracy of the self-location.

4. Second Modified Example

An example has been described above in which the operation of the self-location estimation result switching unit 225 is switched when a self-position change is detected, but an operation mode may be switched.

Figure 13:
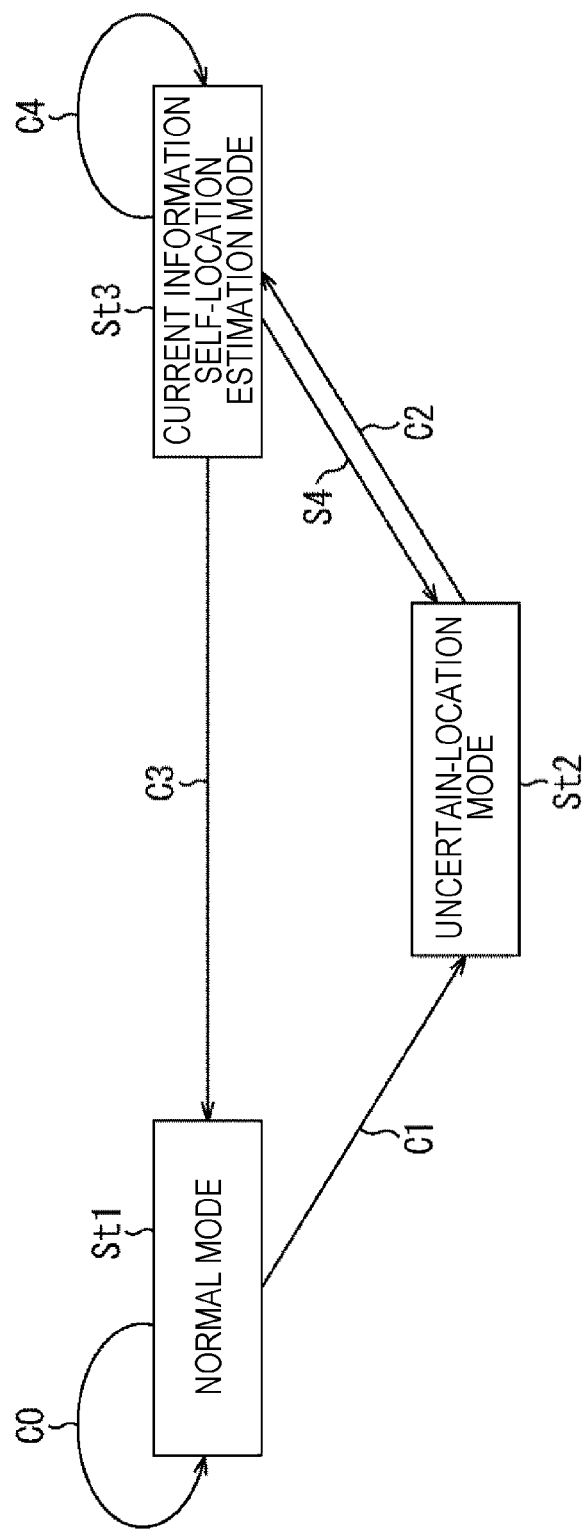
FIG. 13 is a diagram for explaining a state change of an operation mode in a second modified example.

FIG. 13 is a diagram for explaining a state transition of an operation mode in the autonomous movement control unit 110.

The operation mode in the autonomous movement control unit 110 includes three types of operation modes: a normal mode St1, an uncertain-location mode St2, and a current information self-location estimation mode St3.

The normal mode St1 is an operation mode in which time-series information estimation information is adopted as a self-location estimation result. In the normal mode St1, when a position change due to an external force is not detected, a state where the operation mode returns to the normal mode St1 is continued as indicated by an arrow C0. Furthermore, in the normal mode St1, when a position change due to an external force is detected, the operation mode transitions to the uncertain-location mode St2 as indicated by an arrow C1.

The uncertain-location mode St2 is an operation mode in which it is continuously notified that the self-location is in an uncertain state. In the uncertain-location mode St2, after a predetermined time has elapsed, the operation mode transitions to the current information self-location estimation mode St3 as indicated by an arrow C2.

The current information self-location estimation mode St3 is an operation mode in which a current information self-location is adopted as a self-location estimation result. In the current information self-location estimation mode St3, a state where the operation mode returns to the current information self-location estimation mode St3 is continued as indicated by an arrow C4, until a predetermined time elapses. Furthermore, in the current information self-location estimation mode St3, after a predetermined time has elapsed, the operation mode transitions to the normal mode and returns to the original state as indicated by an arrow C3. Furthermore, in the current information self-location estimation mode, when a position change due to an external force is detected, that is, when a position change unpredictable in advance is detected, the operation mode transitions to the uncertain-location mode St2 as indicated by an arrow C4.

<Autonomous Movement Control Process of Second Modified Example>

Figure 14:
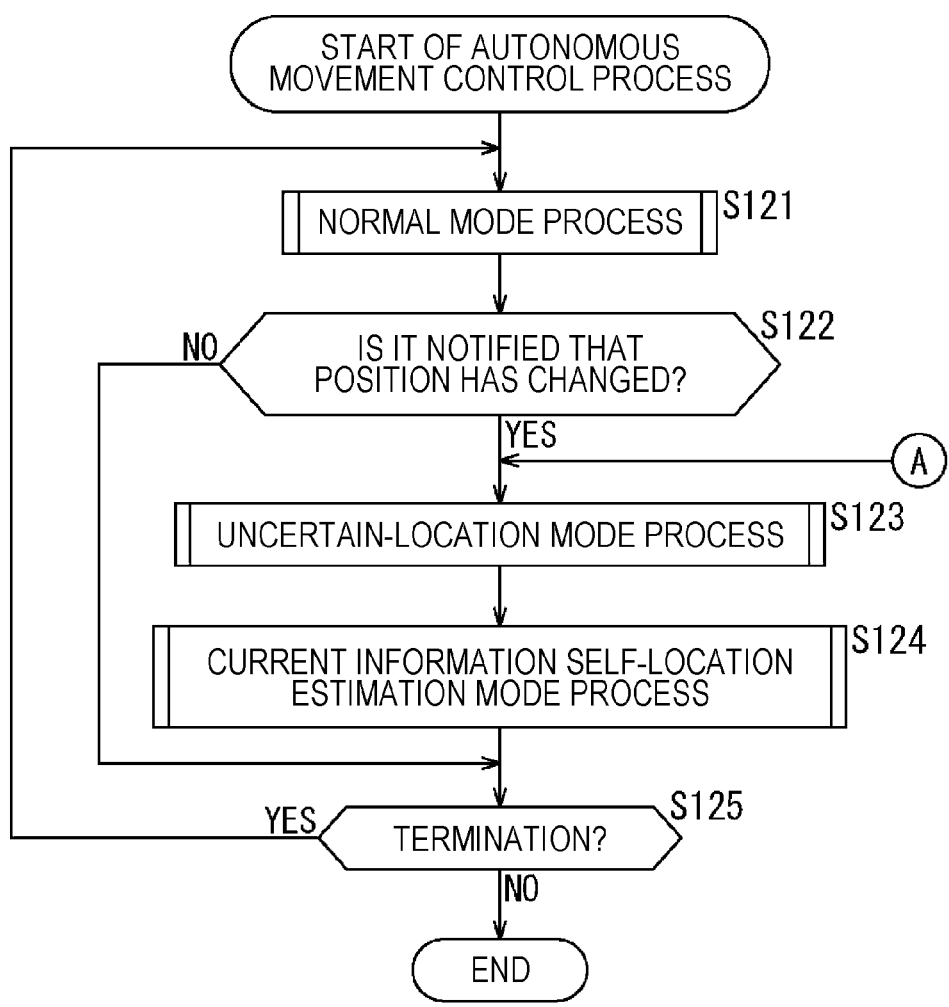
FIG. 14 is a flowchart for explaining an autonomous movement control process according to the second modified example.

Next, with reference to a flowchart in FIG. 14, a description is given to an autonomous movement control process in the autonomous movement control unit 110 including three types of operation modes, that is, the normal mode, the uncertain-location mode, and the current information self-location estimation mode.

In step S121, the self-location estimation result switching unit 225 executes a normal mode process, and operates in the normal mode. Note that details of the normal mode process will be described later with reference to FIG. 15.

In step S122, by the position change detection process, the position change determination unit 251 of the self-location estimation result switching unit 225 determines whether or not it is notified that there has been detected a position change (a position change unpredictable in advance) of changing to a position indicating, for example, a lifted state (kidnap state).

In a case where it is considered in step S122 that a position change (a position change unpredictable in advance) has not been detected, the process proceeds to step S125.

In step S125, it is determined whether or not termination of the process has been instructed, and the process returns to step S121 in a case where termination is not instructed. Furthermore, in a case where no position change is detected in step S122, the processing in steps S121, S122, and S125 is repeated, the normal mode operation state is maintained, and the normal mode process is continued. Note that, in step S125, in a case where termination of the process is instructed, the process is terminated.

<Normal Mode Process>

Figure 15:
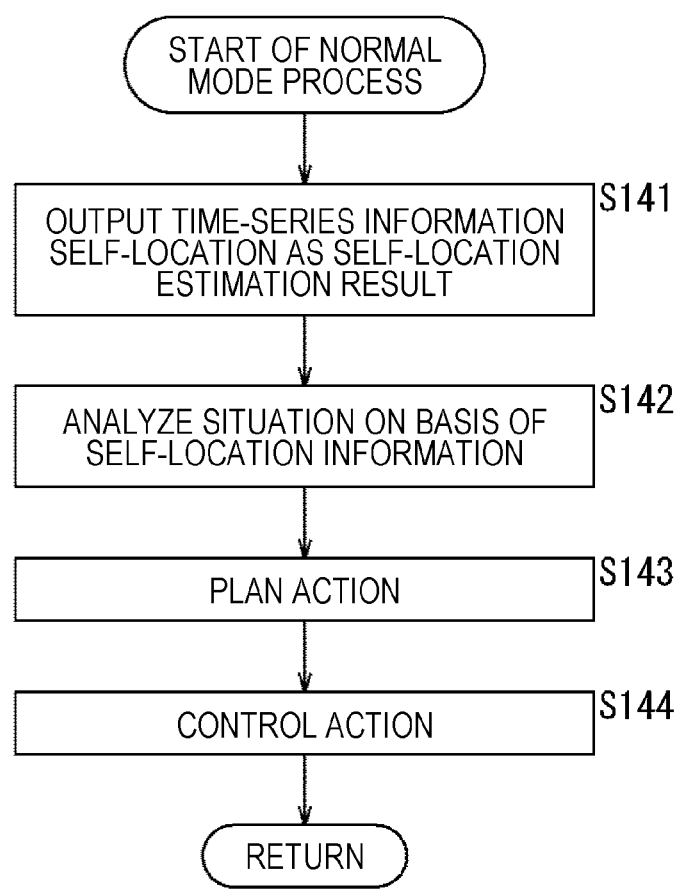
FIG. 15 is a flowchart for explaining a normal mode process in FIG. 14.

Here, the normal mode process will be described with reference to a flowchart in FIG. 15. Note that the processing in steps S141 to S144 in the flowchart in FIG. 15 is similar to the processing in steps S74 to S78 in the flowchart in FIG. 10, and therefore a description thereof will be omitted.

In other words, in the normal mode process, the time-series information self-location is outputted as a self-location estimation result.

Here, the description returns to the flowchart in FIG. 14.

In step S122, in a case where it is considered that a position change (a position change unpredictable in advance) is detected, the operation mode changes from the normal mode to the uncertain-location mode, and the process proceeds to step S123.

In step S123, the autonomous movement control unit 110 executes an uncertain-location mode process and operates in the uncertain-location mode, and the operation is stopped by continuous notifications that the self-location is uncertain. Note that the uncertain-location mode process will be described later in detail with reference to a flowchart in FIG. 16.

In step S124, the operation mode transitions to the current information self-location estimation mode, a current information self-location estimation mode process is executed, and thereafter, the process proceeds to step S125.

In step S125, it is determined whether or not termination of the operation has been instructed, and the process returns to step S121 in a case where termination has not been instructed. In other words, the processing in steps S121 to S125 is repeated until termination is instructed. Then, in step S125, when termination of the process is instructed, the process is terminated. Note that details of the current information self-location estimation mode process will be described later with reference to FIG. 17.

In other words, the operation mode is started from the normal mode St1, and the processing in steps S121, S122, and S125 is repeated and the normal mode process is continuously executed unless a position change is detected. Then, when a position change (a position change unpredictable in advance) is detected in step S122, the operation mode transitions to the uncertain-location mode St2, and the uncertain-location mode process is executed in step S123. Then, thereafter, the operation mode transitions to the current information self-location estimation mode St3, and the current information self-location estimation mode process is executed in step S124. Then, the operation mode transitions to the normal mode again unless termination is instructed.

<Uncertain-Location Mode Process>

Figure 16:
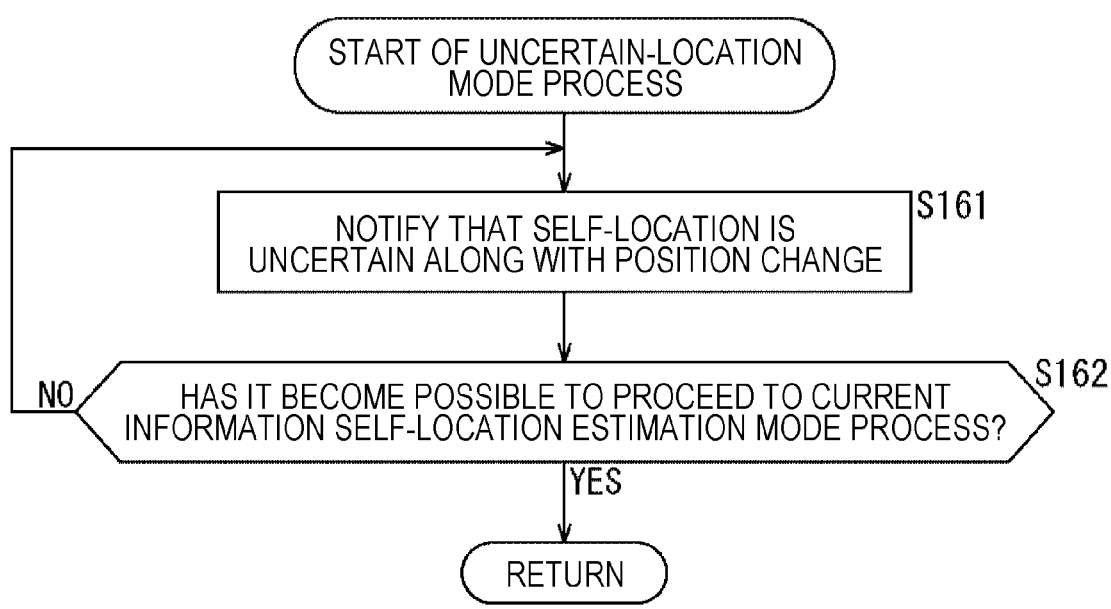
FIG. 16 is a flowchart for explaining an uncertain-location mode process in FIG. 14.

Next, the uncertain-location mode process will be described with reference to the flowchart in FIG. 16.

In step S161, the self-location estimation result switching unit 225 notifies the action control processing unit 123 that the self-location is uncertain along with a position change. Along with this notification, the action control processing unit 123 controls the actuator group 113 to stop the operation of the mobile object 11.

In step S162, the self-location estimation result switching unit 225 determines whether or not a predetermined time has elapsed and it has become possible to transition to the current information self-location estimation mode, and the process returns to step S161 in a case where it is not possible to transition. In other words, the processing in steps S161 and S162 is repeated until a predetermined time elapses and it becomes possible to transition to the current information self-location estimation mode.

Then, in step S162, when a predetermined time has elapsed and it becomes possible to transition to the current information self-location estimation mode, the process is terminated, and the operation mode transitions from the uncertain-location mode to the current information self-location estimation mode.

Furthermore, as another embodiment, the self-location estimation result switching unit 225 may calculate a position change amount for the past x seconds on the basis of a sensor value and the like, and may consider that transition from the uncertain-location mode to the current information self-location estimation mode is possible when a time average of the position change amount falls below a predetermined amount.

Moreover, as another embodiment, the self-location estimation result switching unit 225 may calculate a change amount in a gravity direction with respect to the own body for the past X seconds on the basis of a sensor value and the like, and may consider that transition from the uncertain-location mode to the current information self-location estimation mode is possible when a time average of the change amount falls below a predetermined amount.

By the above processing, in the uncertain-location mode, the processing of notifying that the self-location estimation result is uncertain-location is repeated until a predetermined time elapses. Then, when the predetermined time has elapsed and it becomes possible to transition to the current information self-location estimation mode, the operation mode transitions to the current information self-location estimation mode.

<Current Information Self-Location Estimation Mode Process>

Figure 17:
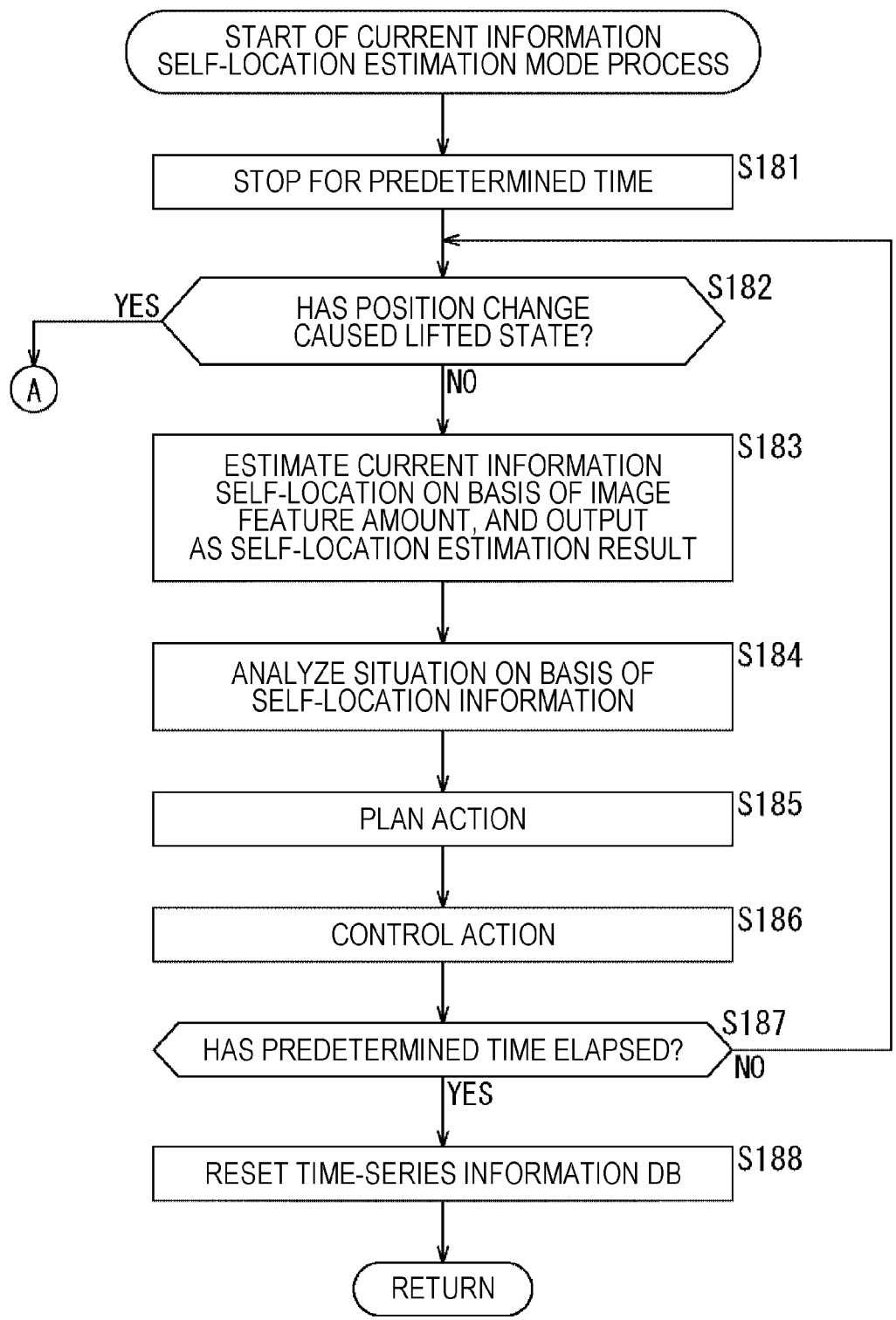
FIG. 17 is a flowchart for explaining a current information self-location estimation mode process in FIG. 14.

Next, the current information self-location estimation mode process will be described with reference to a flowchart in FIG. 17.

In step S181, the self-location estimation result switching unit 225 instructs the action control processing unit 123 to stop the operation for a predetermined time. Along with this instruction, the action control processing unit 123 controls the actuator group 113 to stop the operation of the mobile object 11 for the predetermined time.

In step S182, the position change determination unit 251 of the self-location estimation result switching unit 225 determines whether or not there has been detected a position change (a position change unpredictable in advance) indicating a lifted state (kidnap state) detected by the position change detection process.

In step S182, in a case where a position change (a position change unpredictable in advance) to a position indicating a lifted state (kidnap state) is detected, the process returns to step S123 in FIG. 14. In other words, the operation mode returns from the current information self-location estimation mode to the uncertain-location mode, and the process proceeds to the uncertain-location mode process in step S123.

Whereas, in a case where the position change (a position change unpredictable in advance) of changing to a position indicating a lifted state (kidnap state) is not detected in step S182, the process proceeds to step S183.

In step S183, the self-location estimation result switching unit 225 outputs a current information self-location, which is an estimation result of the current information self-location estimation unit 223, to the situation analysis unit 133 as a self-location estimation result.

In step S184, the situation analysis unit 133 analyzes a situation around the self-location on the basis of the self-location estimation result, and outputs an analysis result to the action plan processing unit 122.

In step S185, the action plan processing unit 122 plans a route to a destination on the basis of the analysis result of surroundings of the self-location estimation result, determines an action plan on the basis of the planned route, generates an operation plan for controlling the actuator group 113, generates an action plan for controlling the actuator group 113, and outputs to the action control processing unit 123.

In step S186, the action control processing unit 123 controls the actuator group 113 on the basis of the operation plan supplied from the operation planning unit 163.

In step S187, the autonomous movement control unit 110 determines whether or not a predetermined time has elapsed, and the process returns to step S182 in a case where the predetermined time has not elapsed. In other words, the processing in steps S182 to S187 is repeated until the predetermined time elapses. Then, in a case where the predetermined time has elapsed in step S187, the process proceeds to step S188.

In step S188, the self-location estimation result switching unit 225 resets past time-series information registered in the time-series information DB 222, the current information self-location estimation mode process is terminated, and the process returns to step S125 in FIG. 14.

By the above processing, by switching the operation mode from the normal mode to the uncertain-location mode when a self-position change (a position change unpredictable in advance) of changing to a position such as a lifted state is detected, it is notified that the self-location estimation result is the uncertain-location, the operation is stopped for a predetermined time, and then the current information self-location estimation mode is set to adopt the current information self-location as the self-location estimation result for a predetermined time. Then, by causing reset of the time-series information registered in the time-series information DB 222 after a predetermined time has elapsed, it becomes possible to continue the autonomous movement control process while appropriately estimating the self-location even after the lifted state and the like.

5. Third Modified Example

In the above, an example has been described in which the operation mode in the self-location estimation result switching unit 225 is switched to the three types of operation modes of the normal mode St1, the uncertain-location mode St2, and the current information self-location estimation mode St3 when there is detected a self-position change that causes a field of view to be narrowed or lost due to a lifted state, a slip when a traveling path is a snowy road or a traveling path is a gravel road, or an environmental change that causes a sensor abnormality (electromagnetic noise, shadow of things), that is, when a position change unpredictable in advance is detected.

However, the type of the self-position change unpredictable in advance may further be a collision of a person, an object, another car, or the like, an accidental failure such as a puncture, a missing part, or a fall of a part or a cargo, and the like.

Figure 18:
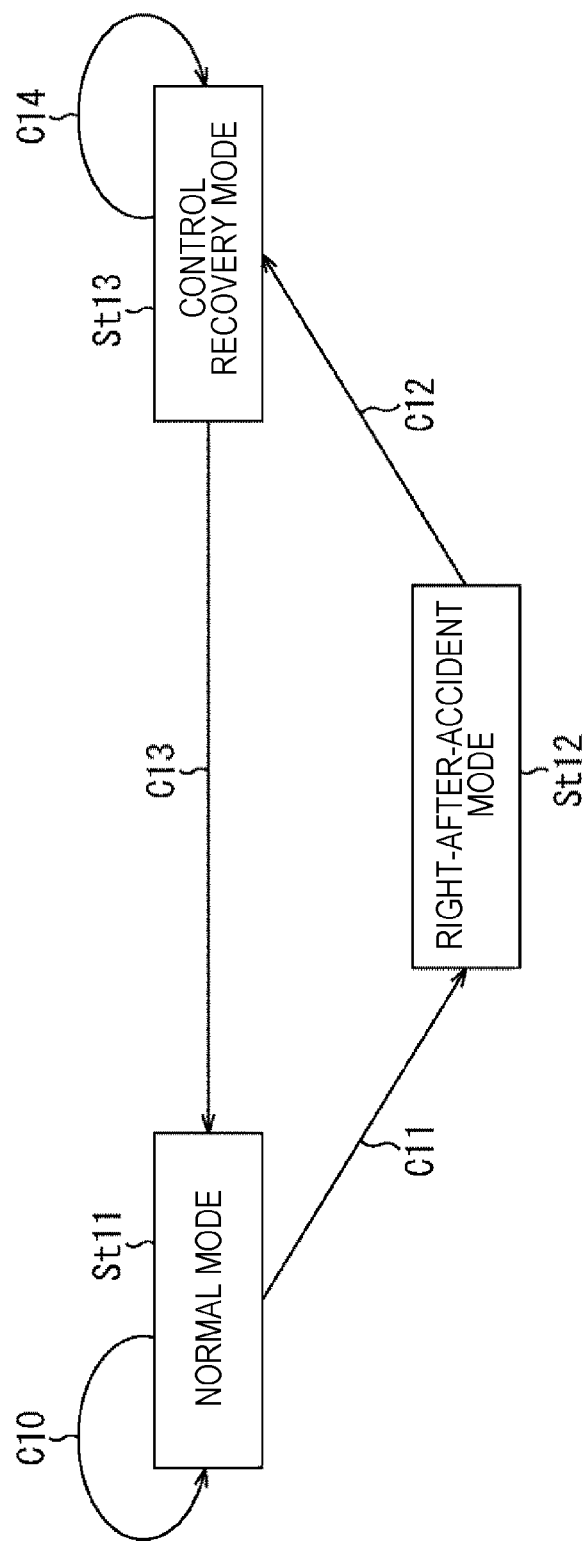
FIG. 18 is a diagram for explaining a state change of an operation mode in a third modified example.

FIG. 18 is a diagram for explaining a state transition of an operation mode in the autonomous movement control unit 110 in a case where the type of the self-position change unpredictable in advance is further a collision with a person, an object, or another car, an accidental failure such as a puncture, a missing part, or a fall of a part or a cargo, and the like.

The operation mode in the autonomous movement control unit 110 includes three types of operation modes: a normal mode St11, a right-after-accident mode St12, and a control recovery mode St13.

The normal mode St11 is similar to the normal mode St1 in FIG. 13, and is an operation mode in which time-series information estimation information is adopted as a self-location estimation result. In the normal mode St11, when a position change due to an external force is not detected, a state where the operation mode returns to the normal mode St1 is continued as indicated by an arrow C10. Furthermore, in the normal mode St11, when an occurrence of an accident is detected as a position change unpredictable in advance, the operation mode transitions to the right-after-accident mode St12 as indicated by an arrow C11.

The right-after-accident mode St12 is an operation mode in a state immediately after an accident, in which time-series information of the time-series information DB 222 is reset and the operation is stopped. In the right-after-accident mode St12, after a predetermined time has elapsed, the operation mode transitions to the control recovery mode St13 as indicated by an arrow C12.

The control recovery mode St13 is an operation mode in which a current information self-location as a self-location is adopted as a self-location estimation result. In the control recovery mode St13, a state where the operation mode returns to the control recovery mode St13 is continued as indicated by an arrow C14, until a predetermined time elapses. Furthermore, in the control recovery mode St13, after the predetermined time has elapsed, the operation mode transitions to the normal mode St11 and returns to the original state as indicated by an arrow C13.

<Autonomous Movement Control Process of Third Modified Example>

Figure 19:
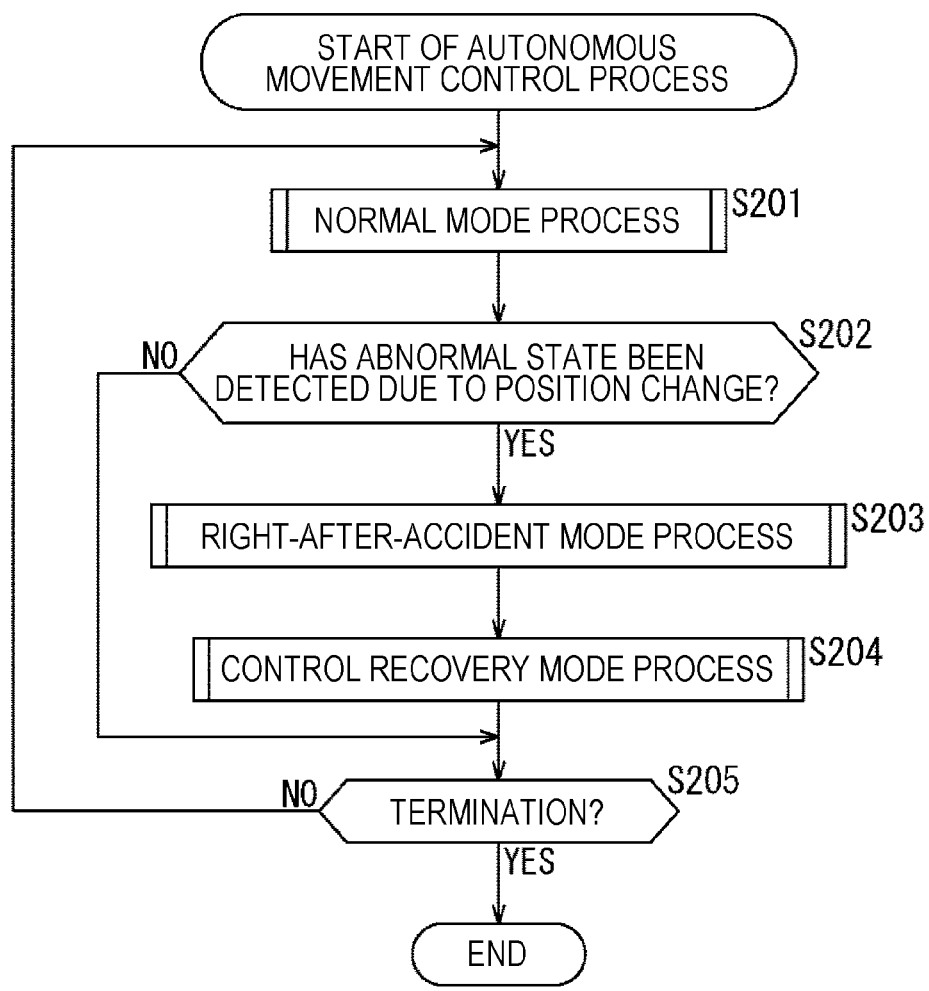
FIG. 19 is a flowchart for explaining an autonomous movement control process according to the third modified example.

Next, an autonomous movement control process in the autonomous movement control unit 110 including three types of operation modes of the normal mode, the right-after-accident mode, and the control recovery mode will be described with reference to a flowchart in FIG. 19.

In step S201, the autonomous movement control unit 110 executes the normal mode process and operates in the normal mode. Note that the normal mode process is similar to the processing described with reference to FIG. 15, and therefore a description thereof will be omitted.

In step S202, the position change determination unit 251 of the self-location estimation result switching unit 225 determines whether or not it is notified that there has been detected a position change (a position change unpredictable in advance) that is detected by the position change detection process and changes to a position indicating an abnormal state such as an occurrence of an accident.

In a case where it is considered in step S202 that a position change (a position change unpredictable in advance) has not been detected, the process proceeds to step S205.

In step S205, it is determined whether or not termination of the process has been instructed, and the process returns to step S201 in a case where termination has not been instructed. In other words, unless a position change (position change unpredictable in advance) of changing to a position indicating an abnormal state such as an occurrence of an accident is detected, the processing in steps S201, S202, and S205 is repeated, the normal mode operation state is maintained, and the normal mode process is continued. Note that, in step S205, in a case where termination of the process is instructed, the process is terminated.

In a case where it is considered in step S202 that a position change (a position change unpredictable in advance) is detected, the operation mode changes from the normal mode to the right-after-accident mode, and the process proceeds to step S203.

In step S203, the autonomous movement control unit 110 executes a right-after-accident mode process to operate in the right-after-accident mode, the operation is stopped, and time-series information registered in the time-series information DB 222 is reset. Note that details of the right-after-accident mode process will be described later with reference to FIG. 20.

In step S204, the operation mode transitions to a control recovery mode process, the operation is performed in the control recovery mode, and thereafter, the process proceeds to step S205. In the control recovery mode process, a current information self-location is adopted as a self-location estimation result, and after a predetermined time has elapsed, the process returns to step S201 and the operation mode returns to the normal mode, unless termination is instructed. Note that details of the control recovery mode process will be described later with reference to FIG. 21.

In other words, the operation mode is started from the normal mode St11, and the processing in steps S201, S202, and S205 is repeated and the normal mode process is continuously executed, unless a position change unpredictable in advance indicating an abnormal state such as an occurrence of an accident is detected. Then, in step S202, when a position change (a position change unpredictable in advance) indicating an abnormal state such as an occurrence of an accident is detected, the operation mode transitions to the right-after-accident mode St12, and the right-after-accident mode process is executed in step S203. Then, thereafter, the operation mode transitions to the control recovery mode St13, and the accident recovery mode process is executed in step S204. Then, the operation mode transitions to the normal mode again unless termination is instructed.

<Right-after-Accident Mode Process>

Figure 20:
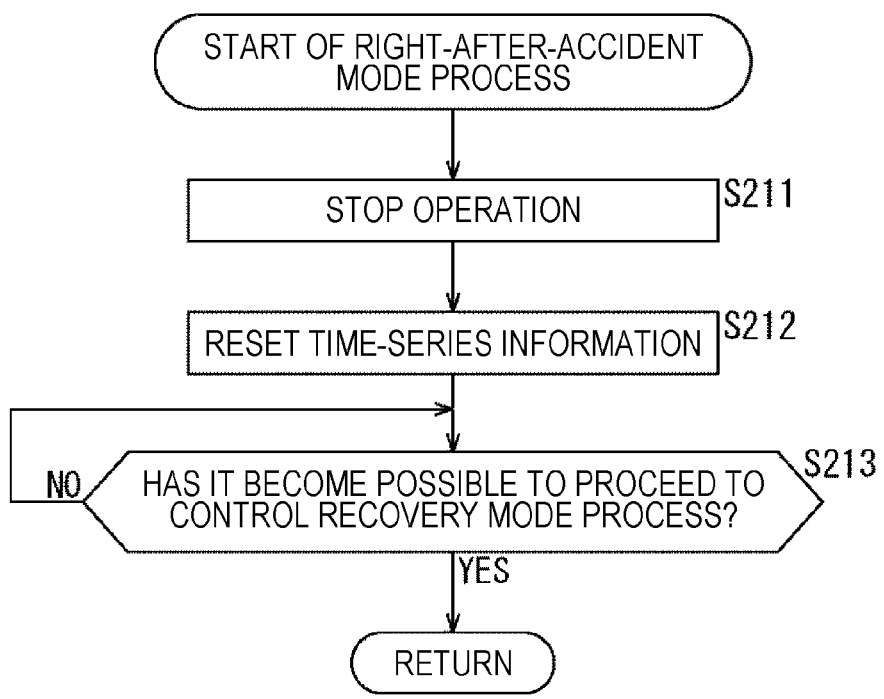
FIG. 20 is a flowchart for explaining a right-after-accident mode process in FIG. 19.

Next, the right-after-accident mode process will be described with reference to a flowchart in FIG. 20.

In step S211, the self-location estimation result switching unit 225 instructs the action control processing unit 123 to stop the operation. Along with this instruction, the action control processing unit 123 controls the actuator group 113 to stop the operation of the mobile object 11.

In step S212, the self-location estimation result switching unit 225 causes reset of time-series information registered in the time-series information DB 222.

In step S213, the self-location estimation result switching unit 225 determines whether or not a predetermined time has elapsed and it has become possible to transition to the control recovery mode, and similar processing is repeated until a predetermined time elapses and it is possible to transition.

Then, in step S213, when the predetermined time has elapsed and it becomes possible to transition to the control recovery mode, the process is terminated, and the operation mode transitions from the right-after-accident mode to the control recovery mode.

Furthermore, as another embodiment, the self-location estimation result switching unit 225 may calculate a position change amount for the past x seconds on the basis of a sensor value and the like, and may consider that transition from the right-after-accident mode to the control recovery mode is possible when a time average of the position change amount falls below a predetermined amount.

Moreover, as another embodiment, the self-location estimation result switching unit 225 may calculate a change amount in a gravitational direction with respect to the own body for the past X seconds on the basis of a sensor value and the like, and may consider that transition from the right-after-accident mode to the control recovery mode is possible when a time average of the change amount falls below a predetermined amount.

By the above processing, in the right-after-accident mode, the operation is stopped by instructing to stop the operation since the accident has just occurred, and the time-series information in the time-series information DB 222 is reset. Then, when a predetermined time has elapsed and it becomes possible to transition to the control recovery mode, the operation mode transitions to the control recovery mode.

<Control Recovery Mode Process>

Next, the control recovery mode process will be described with reference to a flowchart in FIG. 21. Note that the processing in steps S221 to S226 in the flowchart in FIG. 21 is similar to the processing in steps S181 and S183 to S187 in FIG. 17, and therefore a description thereof will be omitted.

Figure 21:
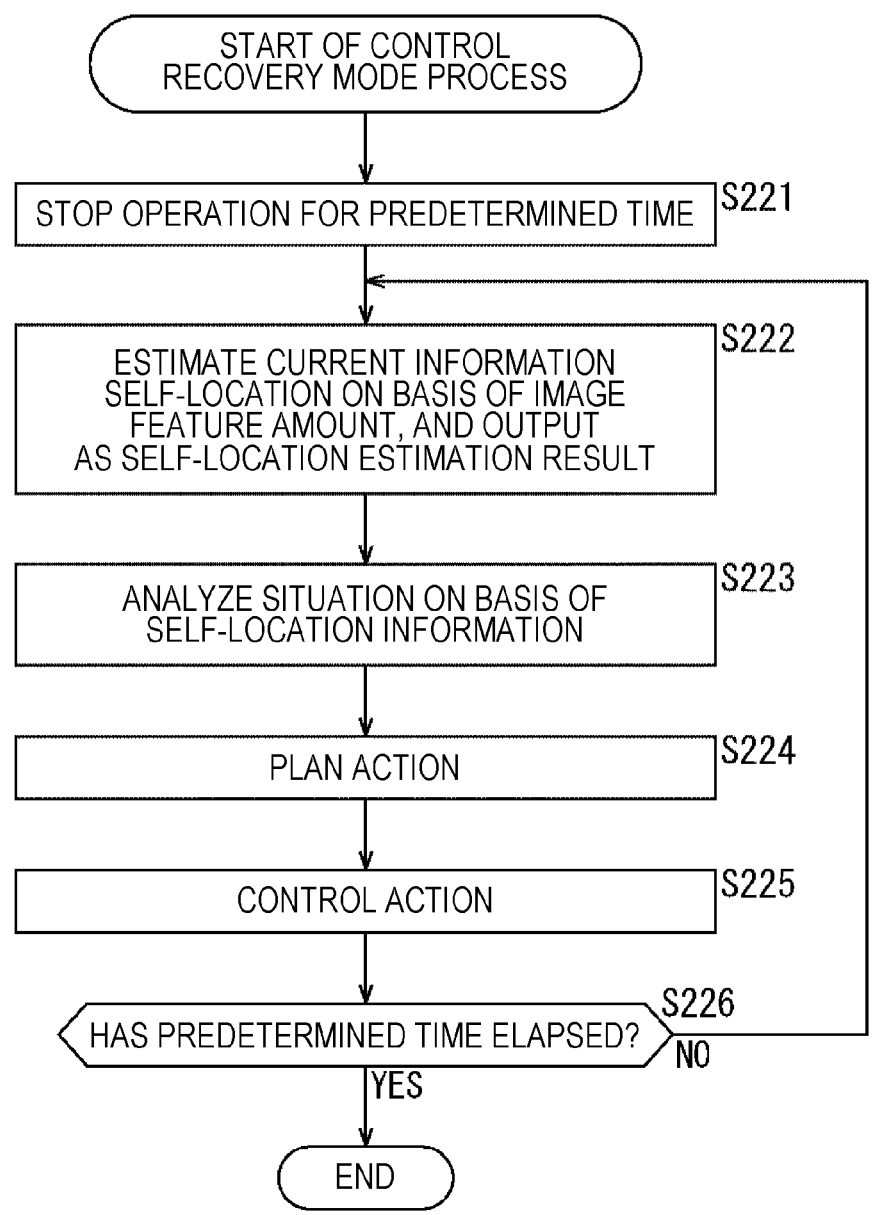
FIG. 21 is a flowchart for explaining a control recovery mode process in FIG. 19.

In other words, in the control recovery mode in FIG. 21, a current information self-location is adopted as a self-location estimation result until the predetermined time elapses, and the operation mode returns to the normal mode.

As a result, even when a position change that is unpredictable in advance and causes an accident is detected, the operation is safely stopped, and then the current information self-location is adopt as the self-location estimation result for the self-location. Therefore, even at a timing when the autonomous movement control unit 110 recovers immediately after the accident, it is possible to prevent a significant decrease in accuracy of the self-location estimation result, by resetting the time-series information predicted to have low accuracy to use for self-location estimation, and adopting the current information self-location as the self-location estimation result.

Note that, as long as a position change unpredictable in advance is detected on the basis of a position change, there may be a case of detecting other than an accident, and may be a case of detecting, for example, a strong wind, an earthquake, a tsunami, an attack from a third party, a change in acceleration of a vehicle on which a car can be mounted (for example, a car ferry boat or the like), and rattling of a track or a road.

In this case, the operation mode may be controlled to transition from the normal mode to the right-after-accident mode or to the uncertain-location mode, and thereafter, the operation mode may be controlled to transition to the control recovery mode or to the current information self-location estimation mode, and then transition to the normal mode.

6. Example of Execution by Software

Meanwhile, a series of processes described above can be executed by hardware or can also be executed by software. In a case where the series of processes are executed by software, programs constituting the software are installed from a recording medium to a computer built in dedicated hardware or, for example, a general-purpose computer and the like capable of executing various functions by installing various programs.

Figure 22:
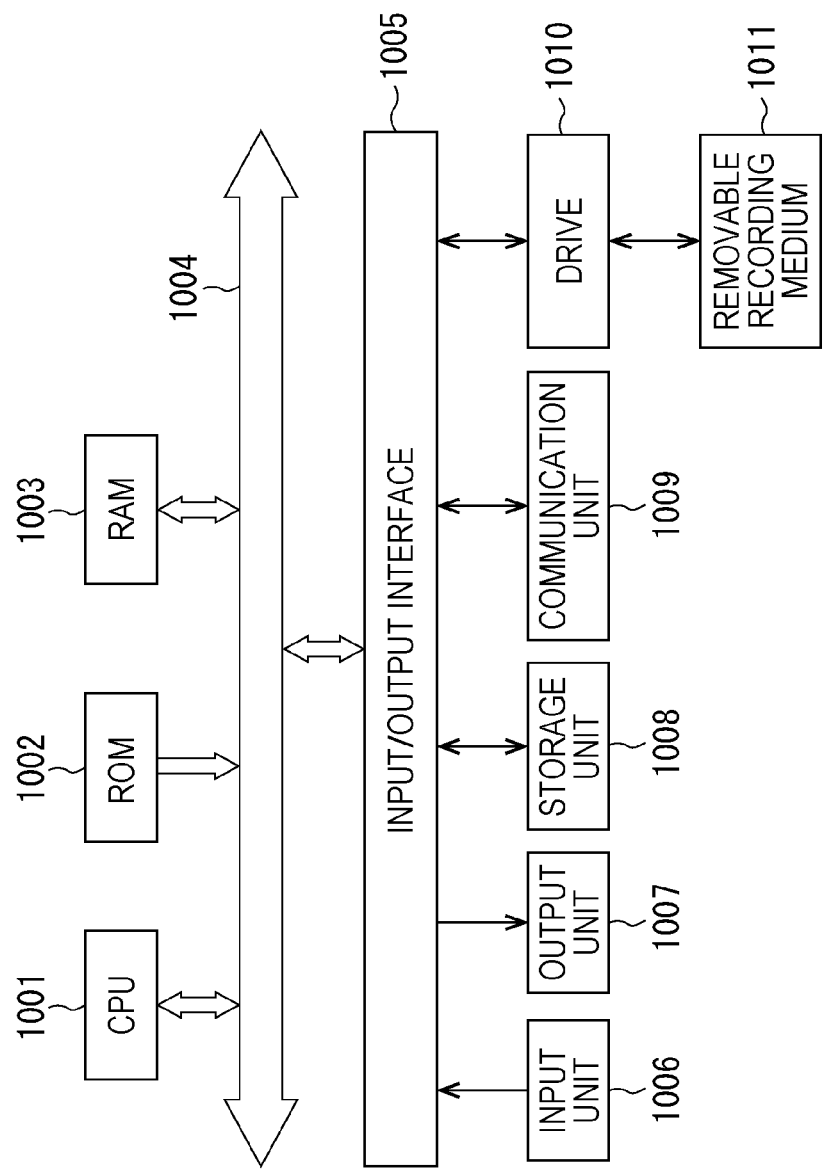
FIG. 22 is a diagram for explaining a configuration example of a general-purpose computer.

FIG. 22 illustrates a configuration example of a general-purpose computer. This personal computer incorporates a central processing unit (CPU) 1001. To the CPU 1001, an input/output interface 1005 is connected via a bus 1004. To the bus 1004, a read only memory (ROM) 1002 and a random access memory (RAM) 1003 are connected.

The input/output interface 1005 is connected with an input unit 1006 including an input device such as a keyboard and a mouse to be inputted with an operation command by a user, an output unit 1007 that outputs a processing operation screen or an image of a processing result to a display device, a storage unit 1008 including, for example, a hard disk drive that stores programs and various data, and a communication unit 1009 that includes a local area network (LAN) adapter and the like and executes communication processing via a network represented by the Internet. Furthermore, there is connected a drive 1010 that reads and writes data from and to a removable medium 1011 such as a magnetic disk (including a flexible disk), an optical disk (including a compact disc-read only memory (CD-ROM) and a digital versatile disc (DVD)), a magneto-optical disk (including a MiniDisc (MD)), or a semiconductor memory.

The CPU 1001 executes various processes in accordance with a program stored in the ROM 1002, or a program read from the removable medium 1011 such as a magnetic disk, an optical disk, a magneto-optical disk, or semiconductor memory, installed in the storage unit 1008, and loaded from the storage unit 1008 into the RAM 1003. The RAM 1003 also appropriately stores data necessary for the CPU 1001 to execute various processes, for example.

In the computer configured as described above, the series of processes described above are performed, for example, by the CPU 1001 loading a program recorded in the storage unit 1008 into the RAM 1003 via the input/output interface 1005 and the bus 1004, and executing.

The program executed by the computer (the CPU 1001) can be provided by being recorded on, for example, the removable medium 1011 as a package medium or the like. Furthermore, the program can be provided via a wired or wireless transmission medium such as a local area network, the Internet, or digital satellite broadcasting.

In the computer, by attaching the removable medium 1011 to the drive 1010, the program can be installed in the storage unit 1008 via the input/output interface 1005. Furthermore, the program can be received by the communication unit 1009 via a wired or wireless transmission medium, and installed in the storage unit 1008. Besides, the program can be installed in advance in the ROM 1002 and the storage unit 1008.

Note that the program executed by the computer may be a program that performs processing in a time series according to an order described in this specification, or may be a program that performs processing in parallel or at necessary timing such as when a call is made.

Note that the CPU 1001 in FIG. 22 causes the function of the autonomous movement control unit 110 in FIG. 3 to be realized. Furthermore, the storage unit 1008 in FIG. 22 realizes the storage unit 109 in FIG. 3.

Furthermore, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are all systems.

Note that the embodiments of the present disclosure are not limited to the above-described embodiments, and various modified examples can be made without departing from the scope of the present disclosure.

For example, the present disclosure can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

Note that the present disclosure can also have the following configurations.

<1> A control device including:
a self-position detection unit configured to detect a self-position on the basis of sensor information;
a position change detection unit configured to detect a position change unpredictable in advance, on the basis of a detection result by the self-position detection unit; and
a self-location estimation unit configured to estimate a self-location with a first estimation model on the basis of sensor information, and estimate a self-location with a second estimation model different from the first estimation model in a case where the position change unpredictable in advance is detected by the position change detection unit.

<2> The control device according to <1>, in which
the self-location estimation unit includes:
a time-series information accumulation unit that accumulates the sensor information as time-series information; and
a time-series information self-location estimation unit configured to use time-series information accumulated in the time-series information accumulation unit to estimate the self-location, and output an estimation result as a time-series information self-location,
in the time-series information accumulation unit, the time-series information of a past time that has been accumulated is reset in a case where the position change unpredictable in advance is detected, and
the time-series information self-location estimation unit uses time-series information accumulated in the time-series information accumulation unit to estimate the self-location, as the first estimation model, and
uses time-series information accumulated in the time-series information accumulation unit after the time-series information of a past time that has been accumulated in the time-series information accumulation unit is reset, to estimate the self-location, as the second estimation model.

<3> The control device according to <2>, in which
by the reset, the time-series information of a past time that has been accumulated in the time-series information accumulation unit is deleted, in an order from time-series information accumulated longer than a predetermined time.

<4> The control device according to <2>, in which
the time-series information self-location estimation unit reduces a weight of a self-location estimated with the time-series information as the time-series information has been accumulated for a longer time in the time-series information accumulation unit after the reset is performed on time-series information of a past time that has been accumulated in the time-series information accumulation unit, to estimate the time-series information self-location.

<5> The control device according to <1>, in which
the self-location estimation unit
includes a time-series information self-location estimation unit configured to estimate a time-series information self-location by using a Kalman filter that repeats a step of updating an observation value of a prior probability density distribution with time-series information that is latest, and
the time-series information self-location estimation unit
estimates the time-series information self-location by using a Kalman filter that repeats a step of updating an observation value of a prior probability density distribution with time-series information that is latest, as the first estimation model, and
estimates the time-series information self-location by using the Kalman filter after maximizing a weight of the time-series information that is latest, as the second estimation model, in a case where the position change unpredictable in advance is detected.

<6> The control device according to <1>, in which
the self-location estimation unit includes:
a time-series information accumulation unit that accumulates as time-series information sensed with the sensor information;
a time-series information self-location estimation unit configured to use time-series information accumulated in the time-series information accumulation unit to estimate the self-location, and output an estimation result as a time-series information self-location; and
a current information self-location estimation unit configured to estimate the self-location on the basis of current information that is current information sensed with the sensor information, and output as a current information self-location, and
the self-location estimation unit
adopts the time-series information self-location as a self-location estimation result in a case where the position change unpredictable in advance is not detected, and
adopts the current information self-location as a self-location estimation result in a case where the position change unpredictable in advance is detected.

<7> The control device according to <1>, in which
the self-location estimation unit:
causes transition of an operation mode to at least a first mode, a second mode, and a third mode in accordance with a detection result of the position change detection unit;
sets the operation mode to the first mode at a start of an operation and estimates the self-location with the first estimation model;
causes, in the first mode, transition of the operation mode to the second mode and notifies that the position change unpredictable in advance has been detected in a case where the position change unpredictable in advance is detected by the position change detection unit;

causes, in the second mode, transition of the operation mode to the third mode after a predetermined time has elapsed, and estimates the self-location with the second estimation model; and causes, in the third mode, transition of the operation mode to the first mode after a predetermined time has elapsed.

<8> The control device according to <7>, in which the self-location estimation unit includes: a time-series information accumulation unit that accumulates the sensor information as time-series information;

a time-series information self-location estimation unit configured to use time-series information accumulated in the time-series information accumulation unit to estimate the self-location, and output an estimation result as a time-series information self-location; and a current information self-location estimation unit configured to estimate the self-location on the basis of current information that is current information sensed with the sensor information, and output as a current information self-location, and adopts, in the first mode, as a self-location estimation result, the time-series information self-location estimated by the time-series information self-location estimation unit with use of time-series information accumulated in the time-series information accumulation unit, as the first estimation model; and adopts, in the third mode, as a self-location estimation result, the current information self-location estimated by the current information self-location estimation unit with use of the current information, as the second estimation model.

<9> The control device according to <8>, in which the position change unpredictable in advance is a change to a state where a change in the self-location and a position loses continuity, and the first mode is a normal mode, the second mode is an uncertain self-location mode, and the third mode is a current information self-location estimation mode.

<10> The control device according to <9>, in which in a case where the operation mode is the current information self-location estimation mode that is the third mode, when the position change unpredictable in advance is detected, the self-location estimation unit causes transition of the operation mode to the uncertain self-location mode that is the second mode.

<11> The control device according to <9>, in which a state where a change in the self-location and a position loses continuity includes a kidnap state, a slip state of a sole contact surface and a wheel, getting on and off of a non-fixed object, and a sensor abnormal state.

<12> The control device according to <8>, in which the position change unpredictable in advance is a change to an accident occurrence state, and the first mode is a normal mode, the second mode is a right-after-accident mode, and the third mode is a control recovery mode.

<13> The control device according to <12>, in which the accident occurrence state includes a collision with a person, an object, and another machine or vehicle, a puncture, a missing part, and a falling state of a part and a cargo.

<14> The control device according to <8>, in which the time-series information is three-dimensional point cloud information detected by LIDAR, and location information, a position, a velocity, an acceleration, and an angular velocity detected by a wheel encoder, the time-series information self-location estimation unit estimates the self-location by using a Kalman filter or a particle filter on the basis of the time-series information, and outputs an estimation result as a time-series information self-location, the current information is a parallax image captured by a stereo camera, and the current information self-location estimation unit generates a depth image from the parallax image, extracts an image feature amount from the depth image, estimates a self-location on the basis of the image feature amount, and outputs an estimation result as a current information self-location.

<15> The control device according to at least one of <1> to <14>, in which the sensor information used when the self-position detection unit detects the self-position includes a vertical acceleration, and the self-position detection unit includes:

a frequency component extraction unit configured to extract a frequency component of a change in the vertical acceleration;

a feature amount extraction unit configured to extract a feature amount from a frequency component extracted by the frequency component extraction unit; and a position detection unit configured to detect the self-position on the basis of the feature amount.

<16> The control device according to <15>, further including:

a database in which the position and a feature amount of the frequency component are registered in association with each other by learning, on the basis of sensor information for a known position, in which the position detection unit detects the position by searching for a corresponding position from the database on the basis of the feature amount.

<17> The control device according to <16>, in which in the database, the position and a feature amount of the frequency component are registered in association with each other by learning using a neural network, on the basis of sensor information for the known position.

<18> A control method including:

a self-position detection process of detecting a self-position on the basis of sensor information;

a position change detection process of detecting a position change unpredictable in advance on the basis of a detection result by the self-position detection process; and a self-location estimation process of estimating a self-location with a first estimation model on the basis of sensor information, and estimating a self-location with a second estimation model different from the first estimation model in a case where the position change unpredictable in advance is detected in the position change detection process.

<19> A program for causing a computer to function as:

a self-position detection unit configured to detect a self-position on the basis of sensor information;

a position change detection unit configured to detect a position change unpredictable in advance, on the basis of a detection result by the self-position detection unit; and a self-location estimation unit configured to estimate a self-location with a first estimation model on the basis of sensor information, and estimate a self-location with a second estimation model different from the first estimation model in a case where the position change unpredictable in advance is detected by the position change detection unit.

<20> A mobile object including:
a self-position detection unit configured to detect a self-position on the basis of sensor information;
a position change detection unit configured to detect a position change unpredictable in advance, on the basis of a detection result by the self-position detection unit;
a self-location estimation unit configured to estimate a self-location with a first estimation model on the basis of sensor information, and estimate a self-location with a second estimation model different from the first estimation model in a case where the position change unpredictable in advance is detected by the position change detection unit;
an action plan generation unit configured to generate an action plan on the basis of a peripheral situation of a self-location estimated by the self-location estimation unit; and
a control unit configured to control an operation of the mobile object on the basis of an action plan determined by the action plan generation unit.

REFERENCE SIGNS LIST

11 Mobile object
21 Sensor group
21a, 21a-1 to 21a-n Sensor
22 Autonomous movement control unit
23 Actuator group
23a, 23a-1 to 23a-n Actuator
31 Recognition processing unit
32 Action plan processing unit
33 Action control processing unit
41 Route planning unit
42 Action Planning unit
43 Operation Planning unit
102 Data acquisition unit
105 Output control unit
106 Output unit
107 Driving system control unit
108 Drive system
110 Autonomous movement control unit
112 Sensor group
113 Actuator group
121 Recognition processing unit
122 Action plan processing unit
123 Action control processing unit
134 Planning unit
161 Route planning unit
162 Action Planning unit
163 Operation Planning unit
201 LIDAR
202 Wheel encoder
203 Stereo camera
204 Internal sensor
221 Time-series information self-location estimation unit
222 Time-series information DB
223 Current information self-location estimation unit
224 Position image feature amount DB
225 Self-location estimation result switching unit
226 Self-position detection unit
227 Feature amount position DB
228 Position change detection unit
251 Position change determination unit
271 Frequency component extraction unit
272 Feature amount extraction unit
273 Position detection unit

The invention claimed is:
1. A control device comprising:
a computer having a central processing unit configured by execution of computer readable instructions to implement
a self-position detector that detects a self-position of the control device on a basis of sensor information applied to the computer;
a position change detector that detects a position change of the control device that is unpredictable in advance on a basis of a detection result by the self-position detector; and
a self-location estimator that is configured to
estimate a self-location of the control device with a first estimation model on a basis of the sensor information; and
estimate a self-location of the control device with a second estimation model different from the first estimation model under a condition that the position change that is unpredictable in advance is detected by the position change detector;
wherein the self-location estimator includes
a time-series information accumulator that accumulates the sensor information therein as time-series information;
a time-series information self-location estimator configured to
use time-series information accumulated in the time-series information accumulator to estimate the self-location of the control device, and
output an estimation result as a time-series information self-location,
wherein in the time-series information accumulator, the time-series information of a past time that has been accumulated is reset in a case where the position change that is unpredictable in advance is detected, and
the time-series information self-location estimator
uses time-series information accumulated in the time-series information accumulator to estimate the self-location, as the first estimation model; and
uses time-series information accumulated in the time-series information accumulator after the time-series information of a past time that has been accumulated in the time-series information accumulator is reset, to estimate the self-location, as the second estimation model.
2. The control device according to claim 1, wherein
by the reset, the time-series information of a past time that has been accumulated in the time-series information accumulator is deleted, in an order from time-series information accumulated longer than a predetermined time.
3. The control device according to claim 1, wherein
the time-series information self-location estimator reduces a weight of a self-location estimated with the time-series information as the time-series information has been accumulated for a longer time in the time-series information accumulator after the reset is performed on time-series information of a past time that has been accumulated in the time-series information accumulator, to estimate the time-series information self-location.
4. The control device according to claim 1, wherein the self-location estimator includes
a time-series information self-location estimator configured to estimate a time-series information self-location by using a Kalman filter that repeats a step of updating an observation value of a prior probability density distribution with time-series information that is latest, wherein the time-series information self-location estimator
estimates the time-series information self-location by using the Kalman filter that repeats a step of updating an observation value of a prior probability density distribution with time-series information that is latest, as the first estimation model, and
estimates the time-series information self-location by using the Kalman filter after maximizing a weight of the time-series information that is latest, as the second estimation model, in a case where the position change that is unpredictable in advance is detected.

5. The control device according to claim 1, wherein the self-location estimator includes:
a time-series information accumulator that accumulates as time-series information sensed with the sensor information;
a time-series information self-location estimator configured to use time-series information accumulated in the time-series information accumulator to estimate the self-location, and output an estimation result as a time-series information self-location; and
a current information self-location estimator configured to estimate the self-location on a basis of current information that is current information sensed with the sensor information, and output as a current information self-location,
wherein the self-location estimator
adopts the time-series information self-location as a self-location estimation result in a case where the position change that is unpredictable in advance is not detected, and
adopts the current information self-location as a self-location estimation result in a case where the position change that is unpredictable in advance is detected.

6. The control device according to claim 1, wherein the self-location estimator
causes transition of an operation mode to at least a first mode, a second mode, and a third mode in accordance with a detection result of the position change detector;
sets the operation mode to the first mode at a start of an operation and estimates the self-location with the first estimation model;
causes, in the first mode, transition of the operation mode to the second mode and notifies that the position change that is unpredictable in advance has been detected in a case where the position change that is unpredictable in advance is detected by the position change detector;
causes, in the second mode, transition of the operation mode to the third mode after a predetermined time has elapsed, and estimates the self-location with the second estimation model; and
causes, in the third mode, transition of the operation mode to the first mode after a predetermined time has elapsed.

7. The control device according to claim 6, wherein the self-location estimator includes:
a time-series information accumulator that accumulates the sensor information as time-series information;
a time-series information self-location estimator configured to use time-series information accumulated in the time-series information accumulator to estimate the self-location, and output an estimation result as a time-series information self-location; and a current information self-location estimator configured to estimate the self-location on a basis of current information that is current information sensed with the sensor information;
output as a current information self-location;
adopts, in the first mode, as a self-location estimation result, the time-series information self-location estimated by the time-series information self-location estimator with use of time-series information accumulated in the time-series information accumulator, as the first estimation model; and
adopts, in the third mode, as a self-location estimation result, the current information self-location estimated by the current information self-location estimator with use of the current information, as the second estimation model.

8. The control device according to claim 7, wherein
the position change that is unpredictable in advance includes a change to a state in which a change in the self-location and a position loses continuity, and
the first mode includes a normal mode, the second mode includes an uncertain self-location mode, and the third mode includes a current information self-location estimation mode.

9. The control device according to claim 8, wherein
in a case where the operation mode is the current information self-location estimation mode that is the third mode, when the position change that is unpredictable in advance is detected, the self-location estimator causes transition of the operation mode to the uncertain self-location mode that is the second mode.

10. The control device according to claim 8, wherein
a state where a change in the self-location and a position loses continuity includes a kidnap state, a slip state of a sole contact surface and a wheel, getting on and off of a non-fixed object, and a sensor abnormal state.

11. The control device according to claim 7, wherein
the position change that is unpredictable in advance includes a change to an accident occurrence state, and
the first mode includes a normal mode, the second mode includes a right-after-accident mode, and the third mode includes a control recovery mode.

12. The control device according to claim 11, wherein
the accident occurrence state includes a collision with a person, an object, and another machine or vehicle, a puncture, a missing part, and a falling state of a part and a cargo.

13. The control device according to claim 7,
wherein the time-series information includes:
three-dimensional point cloud information detected by LIDAR,
location information,
a position,
a velocity,
an acceleration, and
an angular velocity detected by a wheel encoder,
wherein the time-series information self-location estimator
estimates the self-location by using a Kalman filter or a particle filter on a basis of the time-series information, and
outputs an estimation result as a time-series information self-location, the current information includes a parallax image captured by a stereo camera, and
wherein the current information self-location estimator
generates a depth image from the parallax image,
extracts an image feature amount from the depth image, estimates a self-location on a basis of the image feature amount, and outputs an estimation result as a current information self-location.

14. The control device according to claim 1, wherein
the sensor information used when the self-position detector detects the self-position of the control device on a basis of sensor information applied to the computer includes a vertical acceleration, and
the self-position detector includes:
  a frequency component extractor configured to extract a frequency component of a change in the vertical acceleration;
  a feature amount extractor configured to extract a feature amount from a frequency component extracted by the frequency component extractor; and
  a position detector configured to detect the self-position on a basis of the feature amount.

15. The control device according to claim 14, further comprising:
a database in which the position and a feature amount of the frequency component are registered in association with each other by learning, on a basis of sensor information for a known position,
wherein the position detector detects the position by searching for a corresponding position from the database on a basis of the feature amount.

16. The control device according to claim 15, wherein
in the database, the position and a feature amount of the frequency component are registered in association with each other by learning using a neural network, on a basis of the sensor information for the known position.

17. A control method comprising:
a self-position detection process of detecting a self-position of a control device on a basis of sensor information applied to a computer;
a position change detection process of detecting a position change of the control device that is unpredictable in advance on a basis of a detection result by the self-position detection process; and
a self-location estimation process of
  estimating a self-location of the control device with a first estimation model on a basis of the sensor information, and
  estimating a self-location of the control device with a second estimation model different from the first estimation model under a condition that the position change that is unpredictable in advance is detected in the position change detection process;
wherein the self-location estimation process includes
  a time-series information accumulation process of accumulating the sensor information therein as time-series information; and
  a time-series information self-location process of estimating the time-series information accumulated in the time-series information accumulation process to estimate the self-location of the control device, and output an estimation result as a time-series information self-location,
wherein in the time-series information accumulation process, the time-series information of a past time that has been accumulated is reset in a case where the position change that is unpredictable in advance is detected, and
the time-series information self-location process
  uses time-series information accumulated in the time-series information accumulation process to estimate the self-location, as the first estimation model; and
  uses time-series information accumulated in the time-series information accumulation process after the time-series information of a past time that has been accumulated in the time-series information accumulation process is reset, to estimate the self-location, as the second estimation model.

18. A non-transitory computer readable medium having a computer program product with computer readable instructions therein that upon execution by a computer cause the computer to function as:
a self-position detector that detects a self-position of a control device on a basis of sensor information applied to the computer;
a position change detector that detects a position change of the control device unpredictable in advance on a basis of a detection result by the self-position detector; and
a self-location estimator that is configured to
  estimate a self-location of the control device with a first estimation model on a basis of the sensor information, and
  estimate a self-location of the control device with a second estimation model different from the first estimation model under a condition that the position change that is unpredictable in advance is detected by the position change detector
wherein the self-location estimator includes
  a time-series information accumulator that accumulates the sensor information therein as time-series information; and
  a time-series information self-location estimator configured to use the time-series information accumulated in the time-series information accumulator to estimate the self-location of the control device, and output an estimation result as a time-series information self-location,
wherein in the time-series information accumulator, the time-series information of a past time that has been accumulated is reset in a case where the position change that is unpredictable in advance is detected, and
the time-series information self-location estimator
  uses time-series information accumulated in the time-series information accumulator to estimate the self-location, as the first estimation model; and
  uses time-series information accumulated in the time-series information accumulator after the time-series information of a past time that has been accumulated in the time-series information accumulator is reset, to estimate the self-location, as the second estimation model.

19. A mobile object comprising:
a computer having a central processing unit configured to execute computer readable instructions to cause the computer to implement:
a self-position detector that detects a self-position of the mobile object on a basis of sensor information applied to the computer;
a position change detector that detects a position change of the mobile object unpredictable in advance on a basis of a detection result by the self-position detector;
a self-location estimator that is configured to
  estimate a self-location of the mobile object with a first estimation model on a basis of the sensor information, and
  estimate a self-location of the mobile object with a second estimation model different from the first estimation model under a condition that the position change that is unpredictable in advance is detected by the position change detector;

an action plan generator configured to generate an action plan on a basis of a peripheral situation of a self-location of the mobile object estimated by the self-location estimator; and a controller configured to control an operation of the mobile object on a basis of an action plan determined by the action plan generator;

wherein the self-location estimator includes a time-series information accumulator that accumulates the sensor information therein as time-series information; and a time-series information self-location estimator configured to use the time-series information accumulated in the time-series information accumulator to estimate the self-location, and output an estimation result as a time-series information self-location wherein in the time-series information accumulator, the time-series information of a past time that has been accumulated is reset in a case where the position change that is unpredictable in advance is detected, and the time-series information self-location estimator
uses time-series information accumulated in the time-series information accumulator to estimate the self-location, as the first estimation model; and
uses time-series information accumulated in the time-series information accumulator after the time-series information of a past time that has been accumulated in the time-series information accumulator is reset, to estimate the self-location, as the second estimation model.

\* \* \* \* \*